United States Patent
Kanzaki et al.

(10) Patent No.: US 8,891,390 B2
(45) Date of Patent: Nov. 18, 2014

(54) WIRELESS BASE STATION FOR CONTROLLING ANTENNA TRANSMISSION POWER

(75) Inventors: Hajime Kanzaki, Hiratsuka (JP); Kenzaburo Fujishima, Kokubunji (JP); Mikio Kuwahara, Yokohama (JP); Katsuhiko Tsunehara, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 86 days.

(21) Appl. No.: 13/308,672

(22) Filed: Dec. 1, 2011

(65) Prior Publication Data

US 2012/0140658 A1    Jun. 7, 2012

(30) Foreign Application Priority Data

Dec. 3, 2010 (JP) .................. 2010-269877

(51) Int. Cl.
  *H04L 12/26*  (2006.01)
  *H04B 17/00*  (2006.01)
  *H04B 7/06*   (2006.01)
  *H04B 7/04*   (2006.01)

(52) U.S. Cl.
  CPC .......... *H04B 17/005* (2013.01); *H04B 17/0067* (2013.01); *H04B 7/068* (2013.01); *H04B 7/0426* (2013.01)
  USPC .......................................... 370/252; 370/329

(58) Field of Classification Search
  CPC ...... H04L 47/00; H04L 43/00; H04B 7/0426; H04B 17/0067
  USPC .......................................... 370/328–338, 252
  See application file for complete search history.

(56) References Cited

U.S. PATENT DOCUMENTS

| | | | |
|---|---|---|---|
| 6,788,661 B1* | 9/2004 | Ylitalo et al. | 370/334 |
| 6,799,025 B1* | 9/2004 | Hoshino | 455/276.1 |
| 7,639,984 B2* | 12/2009 | Uwano et al. | 455/63.1 |
| 8,000,745 B2 | 8/2011 | Kuwahara et al. | |
| 2003/0199269 A1* | 10/2003 | Tobe et al. | 455/422.1 |
| 2007/0207838 A1 | 9/2007 | Kuwahara et al. | |

FOREIGN PATENT DOCUMENTS

| | | |
|---|---|---|
| JP | 2006-270216 | 10/2006 |
| JP | 2007-243258 | 9/2007 |

OTHER PUBLICATIONS

Part 16: Air Interface for Broadband Wireless Access Systems, IEEE P802.16m/D9, Oct. 6, 2010.
$3^{rd}$ Generation Partnership Project; Technical Specification Group Radio Access Network; Evolved Universal Terrestrial Radio Access (E-UTRA); Further advancements for E-UTRA physical layer aspects (Release 9), 3GPP TR 36.814 V9.0.0, Mar. 2010.
JP office Action for Japanese Application No. 2010-269877, issued on Feb. 4, 2014.

* cited by examiner

*Primary Examiner* — Andrew Lai
*Assistant Examiner* — Sumitra Ganguly
(74) *Attorney, Agent, or Firm* — Antonelli, Terry, Stout & Krauss, LLP.

(57) ABSTRACT

Provided is a wireless communication system which includes a wireless communication unit using plural frequency bands and plural antennas. The system changes the transmission power of each antenna, based on the interference of each of the frequency bands from the neighbor base station along the antenna direction. The system estimates the number of antennas necessary for transmission in response to a user requirement, and determines a necessary antenna in accordance with the antenna direction in which the terminal is located, and further changes the transmission power of each antenna.

7 Claims, 30 Drawing Sheets

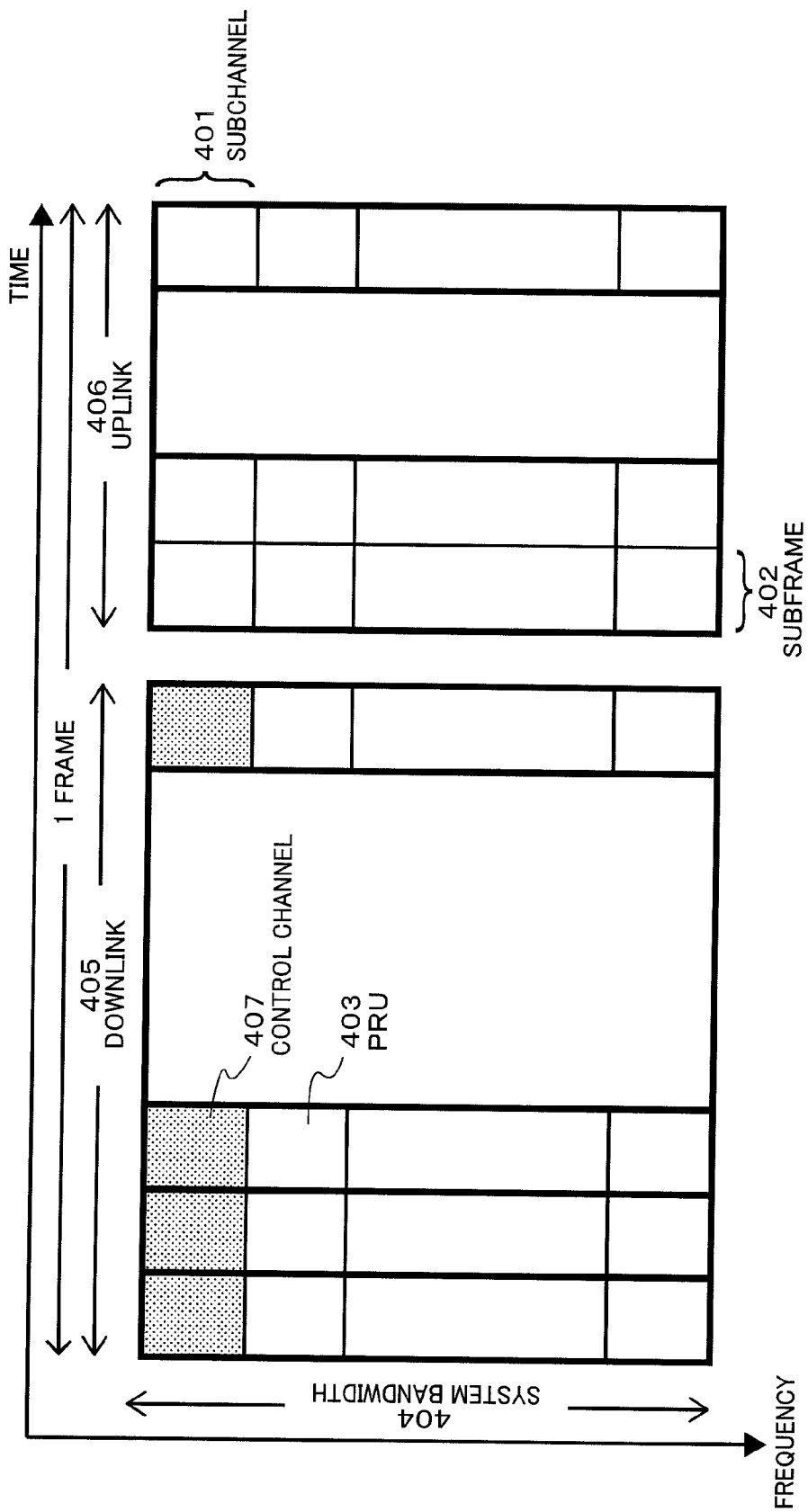

FIG. 15

| TRANSMISSION POWER 1501 | FREQUENCY BAND 1502 | | |
|---|---|---|---|
| ANTENNA DIRECTION | FA0 | FA1 | FA2 |
| 0 | G00 | G01 | G02 |
| 1 | G10 | G11 | G12 |
| 2 | G20 | G21 | G22 |
| ... | | | |
| D | GD0 | GD1 | GD2 |

FIG. 16

| 1601 | USER REQUIREMENT INFORMATION 1602 | | |
|---|---|---|---|
| USER INDEX | MINIMUM REQUIRED RATE | MAXIMUM SUSTAINED RATE | BUFFER |
| 0 | Rmin0 | Rmax0 | B0 |
| 1 | Rmin1 | Rmax1 | B1 |
| 2 | Rmin2 | Rmax2 | B2 |
| ... | | | |
| M | RminM | RmaxM | BM |

WIRELESS BASE STATION FOR CONTROLLING ANTENNA TRANSMISSION POWER

CLAIM OF PRIORITY

The present application claims priority from Japanese patent application JP2010-269877 filed on Dec. 3, 2010, the content of which is hereby incorporated by reference into this application.

BACKGROUND OF THE INVENTION

The present invention relates to a base station, a communication terminal, and a wireless communication system in which the base station and the communication terminal transmits and receives data through a wireless network, and, more particularly, to an interference control technique for a base station including plural antennas.

In general, in a digital mobile communication system using OFDMA (Orthogonal Frequency Division Multiple Access), as disclosed in U.S. Patent Application Publication US2007/0207838, communication is made between plural terminals in a certain frequency bandwidth and time unit (called a frame), in more particular, using wireless resources divided in frequencies and time. In IMT-Advanced as the fourth generation communication system using the OFDMA, for improvement in the throughput, both a multicarrier technique and a MIMO (Multiple-Input Multiple-output) technique are applied, as disclosed in 3GPP, TR 36.814 v9.0.0, March 2010 (see Multicarrier p 8 Section 5).

In the multicarrier technique, a base station can use plural frequency bands at the same time. For example, in a system configured with three frequency bands with a bandwidth of 10 MHz, each base station uses the entire three frequency bands of 10 MHz for communication with the terminals, thereby improving the throughput. Generally, in the OFDMA system, the interference occurs between cells if the same frequency is used between neighbor cells, thus degrading the throughput. In the IMT-Advanced in which each base station can use plural frequency bands, the same frequency band is used between the neighbor cells, thus requiring a technique for minimizing the inter-cell interference. As a method for minimizing the inter-cell interference, the beamforming technique is known as one for restricting antenna beams in a certain range. For example, in a terminal, the received signal power is high, when the beams from its own base station are directed to the terminal. On the contrary, the interference power is high, when the beams from a neighbor base station using the same frequency are directed to the corresponding terminal. An article, IEEE802.16, P802.16 m/D9, October 2010, (See Multicarrier, p 537 FIG. 496), introduces a technique. According to this technique, a base station has a beam pattern that is changed to a frequency direction, different combinations of the frequency and the beam pattern are set between the base station, thereby forming at least one frequency with less interference for each terminal, and wireless resources are assigned to the frequency, thereby minimizing the interference.

On the other hand, in the MIMO technique, to improve the throughput, plural signals are multiplexed into the same wireless resource using plural transmitter/receiver antennas. In the base station, the user throughput and the cell throughput are improved by adaptively combining two techniques. The techniques are SU (Single-User)-MIMO for multiplexing plural signals for one terminal and MU (Multi-User)-MIMO for multiplexing signals for plural terminals.

BRIEF SUMMARY OF THE INVENTION

With a multicarrier technique, each of base stations can use plural frequency bands at the same time. When each base station uses the entire frequency bands such that the frequency reuse factor=1, the frequency utilization efficiency is improved so as to maximize the throughput. In the inter-cell interference minimizing technique, the beam pattern is changed to the frequency direction, thus limiting a frequency(s) with high signal quality, and restricting a frequency to be assigned. Even if there is so little traffic with little interference, it is difficult to attain high throughput.

The MIMO technique optimizes the communication by using the SU-MIMO and the MU-MIMO. In the SU-MIMO, a large number of signals are multiplexed for one terminal when the terminal requires high throughput. In the MU-MIMO, a large number of signals can be multiplexed for a large number of terminals when the terminals need to be allocated though they do not require high throughput. In the SU-MIMO, signals can easily be multiplexed by narrowly focusing the beam. However, plural terminals can easily be multiplexed by spatially separating the beams in accordance with the terminal location, resulting in different forms of suitable beams. If the beam pattern is determined only in consideration of the inter-cell interference, the beam pattern suitable for the MIMO cannot be selected in accordance with a user requirement.

An object of the present invention is to provide a wireless communication unit and a wireless communication system that realize a communication environment in accordance with a terminal, while minimizing the inter-cell interference.

In order to address at least above-described one object, according to an aspect of the present invention, there is provided a wireless communication system which includes a wireless communication base station having plural antennas and performs communication using at lest one frequency band of plural frequency bands, and which changes transmission power of each antenna based on the interference of each frequency band from a neighbor base station.

According to another aspect of the present invention, the number of antennas necessary for transmission is estimated in accordance with a terminal requirement, a necessary antenna(s) is determined based on the antenna direction of the terminal location, and transmission power of each antenna is changed.

According to still another aspect of the present invention, the inter-cell interference can be minimized.

BRIEF DESCRIPTION OF THE DRAWINGS

FIG. 4 is a diagram showing an example of a communication frame transmitted between a terminal and a base station, according to each embodiment of the present invention;

FIG. 15 is a diagram showing a composition of a beam pattern table, according to the first embodiment;

FIG. 16 is a diagram showing a composition of a user requirement table, according to the first embodiment;

DETAILED DESCRIPTION OF THE INVENTION

Detailed description will now be made to various embodiments of a wireless communication system that applies the present invention, a wireless communication base station and a wireless terminal in the wireless communication system, with reference to the drawings. First, descriptions will be made to an embodiment of the wireless communication system that applies various embodiments of the present invention.

Figure 2:
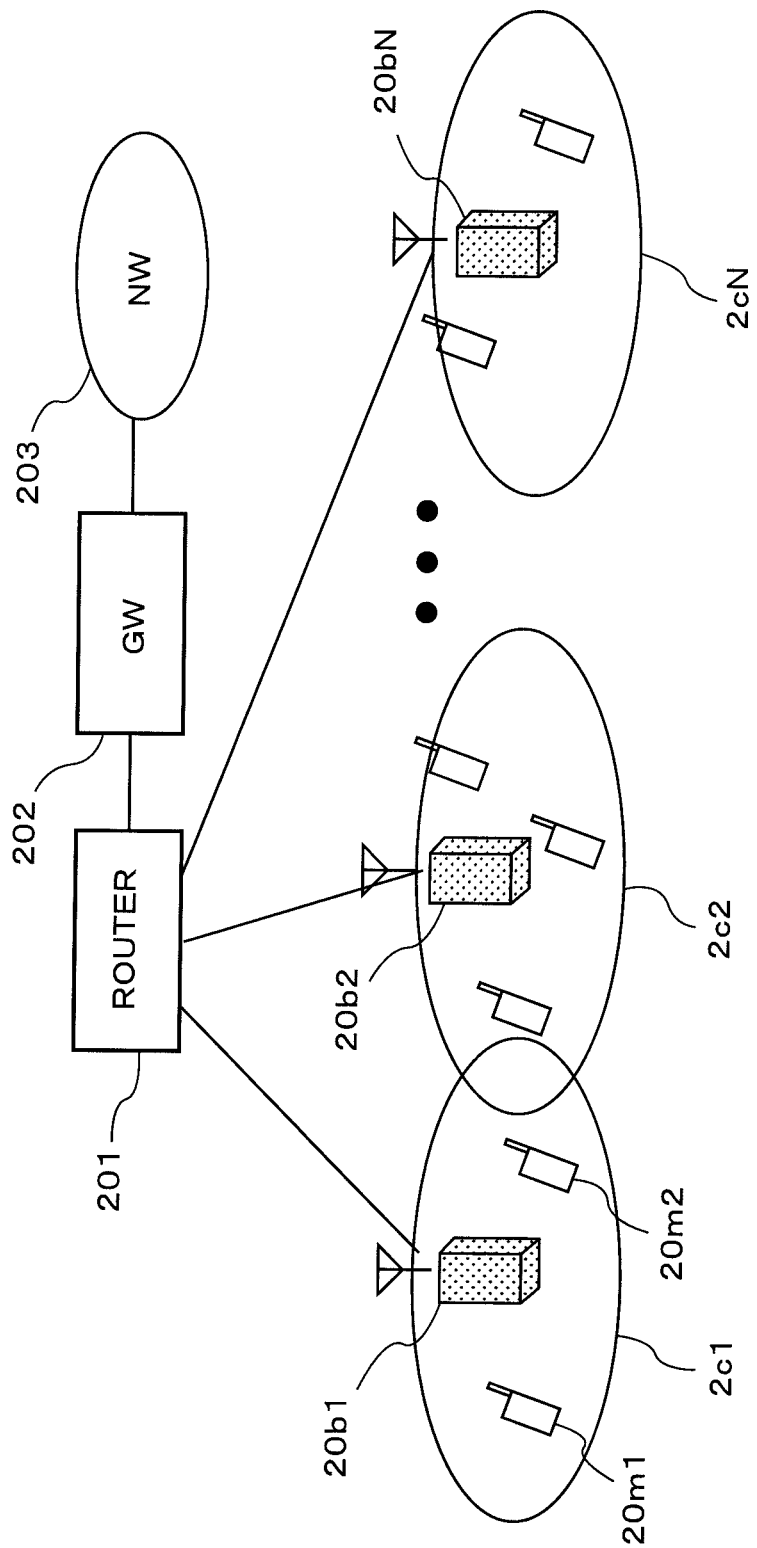
FIG. 2 is a diagram showing an example of a mobile wireless communication system that applies each embodiment of the present invention.

The wireless communication system according to various embodiments is applied to a network configuration shown, for example, in FIG. 2. The wireless communication system includes plural base stations 20*b*1, 20*b*2, . . . 20*b*N, and plural terminals 20*m*1, 20*m*2 . . . that wirelessly communicate with the base stations in the respective cells 2*c*1, 2*c*2, . . . 2*c*N as wireless communication ranges of the base stations. The base stations 20*b*1, 20*b*2, . . . 20*b*N are connected to an external communication network, for example, Internet (NW) 203, through a router (or L3 switch) 201 and a gateway (GW) 202. Note, however, that the network configuration of this embodiment is not limited to this, and any other network configuration is possible as long as the base station and the terminal perform wireless access to each other.

Figure 3A:
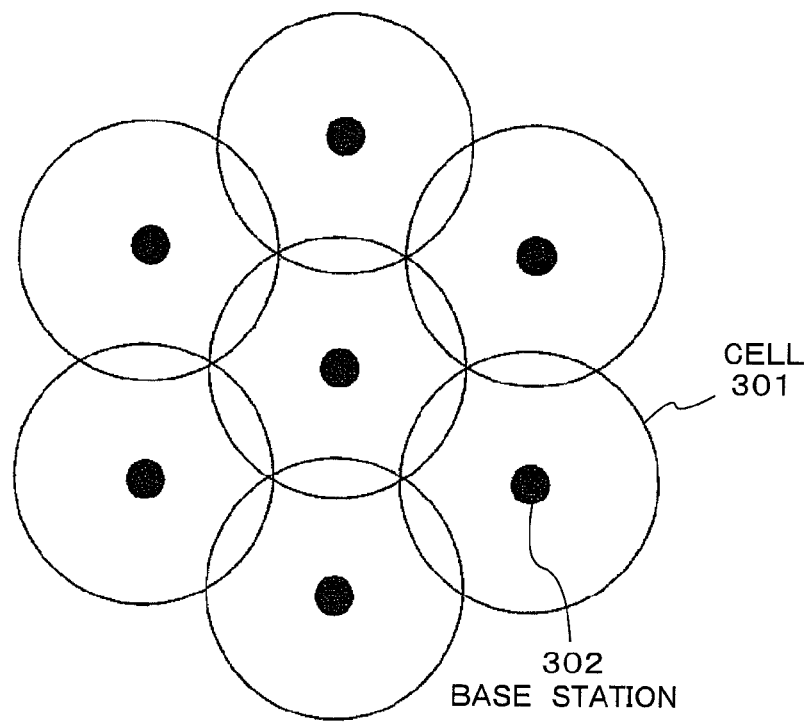
FIGS. 3A and 3B are diagrams each showing an example of a base station layout of the mobile communication system that applies each embodiment of the present invention.
Figure 3B:
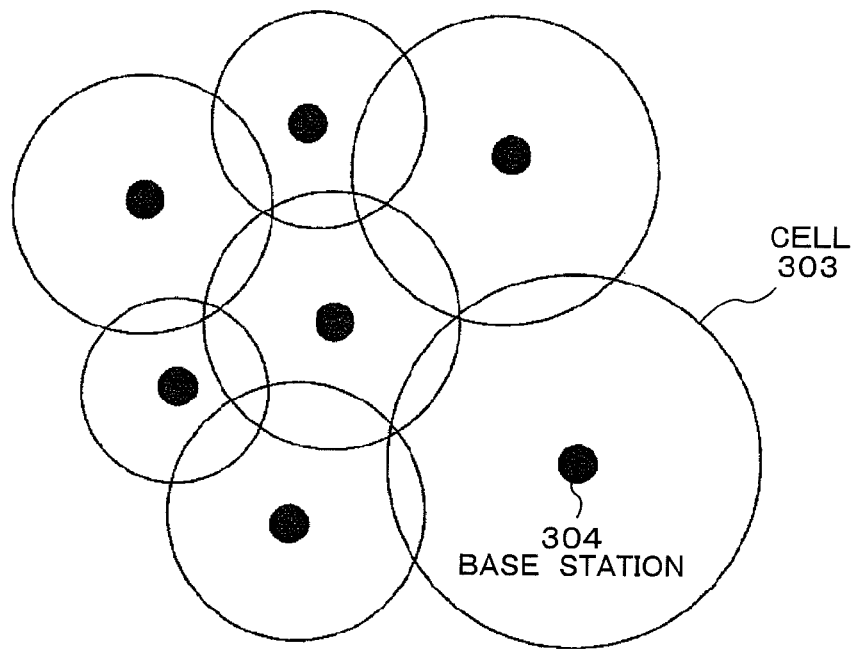

The plane arrangement of the base stations is shown in FIG. 3A and FIG. 3B. When a uniform cell radius is attained between the base stations, a hexagonal cell arrangement is generally made. This arrangement is shown in FIG. 3A. The cell of the base station 302 is denoted with a reference numeral 301. On the contrary, when a uniform cell radius is not attained between the base stations, a hexagonal cell arrangement is not made, and an irregular arrangement of base stations is made as shown in FIG. 3B. This embodiment is realized in each of the arrangements of base stations.

FIG. 4 shows an example of a frame configuration for use in the wireless communication system of this invention. FIG. 4 shows a frame configuration of "IEEE802.16 m". The frequency bandwidth for use in communication is called "system bandwidth 404". The system bandwidth is divided in the unit of sub-channel 401, and divided in the unit of sub-frame 402 along the time. The time and frequency range divided into 1 sub-channel and 1 sub-frame are referred to as PRU (Physical Resource Unit) 403. Assignment information regarding assigned wireless resources for terminals and control information regarding system configurations are transmitted using a control channel 407 of any one of or plural sub-frames 402. A downlink control message and an uplink control message can be transmitted using PRU other than the control channel 407 of each sub-frame 402. This frame configuration is assumed based on the assumption of OFDMA (Orthogonal Frequency Division Multiple Access) of TDD (Time Division Duplex). This can be applied also in FDD (Frequency Division Duplex).

Figure 5:
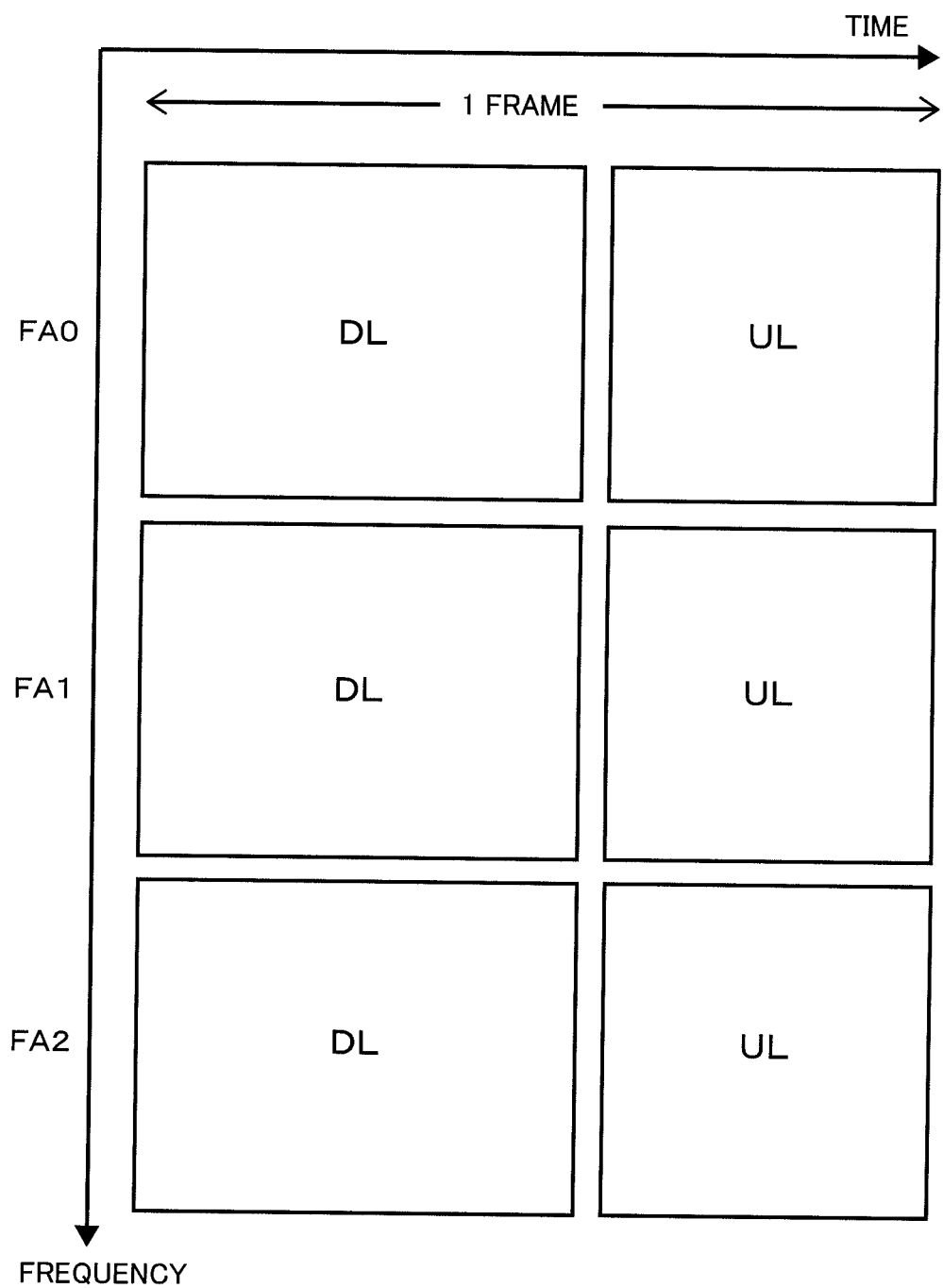
FIG. 5 is a diagram showing an example of a communication frame transmitted between a terminal and a base station, in plural frequency bands, according to each embodiment of the present invention.

The wireless communication system according to this embodiment has plural frequency bandwidths for use in communication. In the system, each of the base stations communicates with the terminal using plural frequencies. As shown in FIG. 5, each base station communicates with the terminal using a frame configuration for performing wireless communication in the plural frequency bands "FA0", "FA1", and "FA2".

First Embodiment

Descriptions will now be made to a configuration of the wireless communication system according to the first embodiment. In the system, the base stations include various antennas or groups of antennas, with different beam patterns. After changing the transmission power of each of frequency bands of each antenna based on interference information, the transmission power of each frequency band of each antenna is further changed in response to a communication requirement from the terminal.

Figure 6:
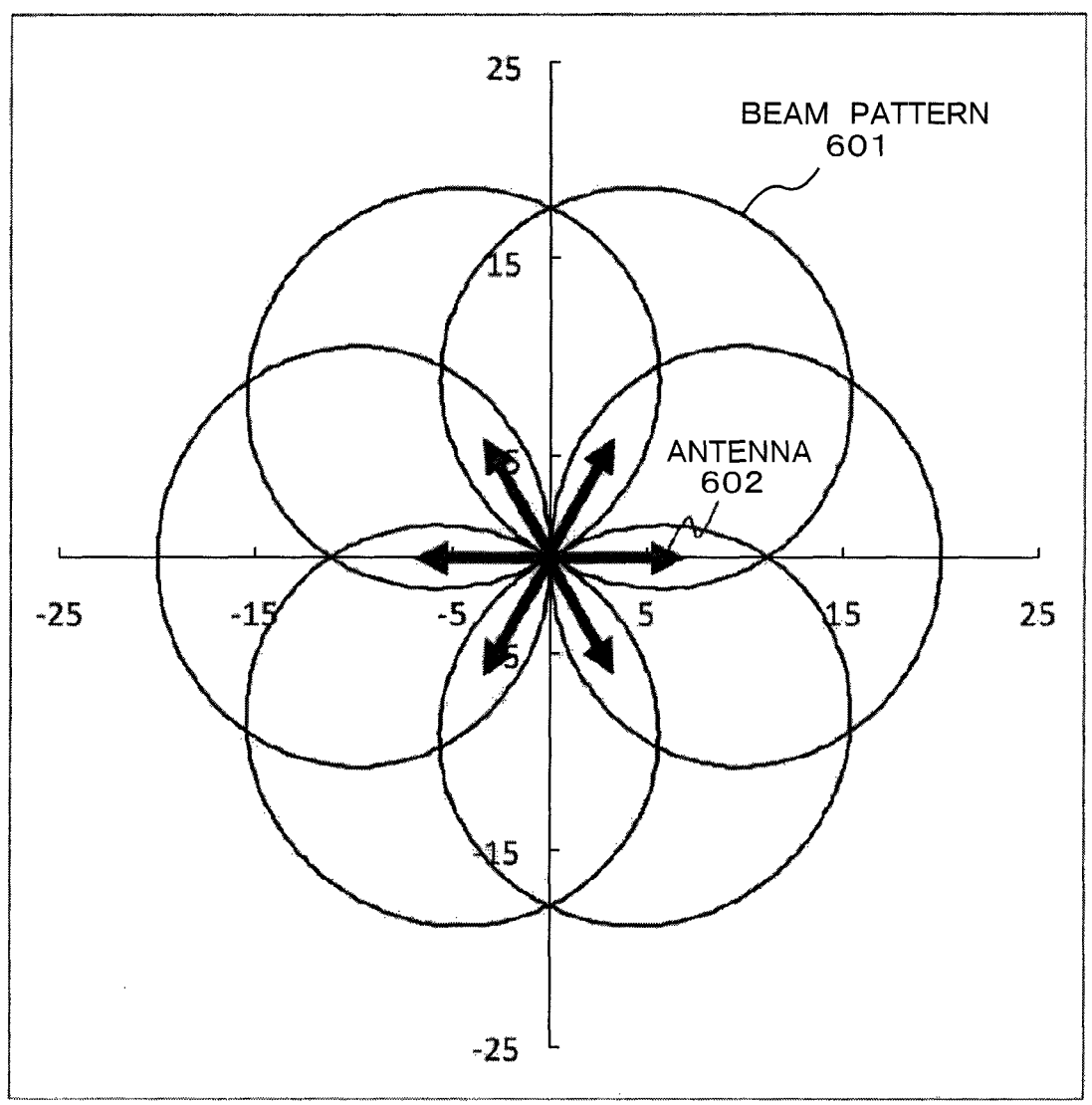
FIG. 6 is a diagram showing an example of a beam pattern of a base station, according to each embodiment of the present invention.

FIG. 6 shows a beam pattern of antennas of the base station 20b, in this embodiment. The base station has an antenna 602 with six elements, and has a beam pattern 601 in six directions. In this case, one single element of the antenna elements may be a group of antennas. As shown in FIG. 6, the beam patterns of each antenna element are at equal angles in different directions. The beam pattern of the base station of this embodiment is not limited to this, and may be any other form as long as the antennas or antenna group have different beam patterns.

Descriptions will now be made to a device configuration of the base station 20b according to the first embodiment, with reference to the block diagram of FIG. 1.

The base station 20b includes a controller 110, an antenna 109, a switch 108 for switching between transmission and reception, a backhaul interface 101, an upper layer control unit 102, a transmitter RF (Radio Frequency) unit 106 and a receiver RF unit 107, an antenna gain adjustment unit 112, a Downlink baseband processing unit 104, an Uplink baseband processing unit 105, a scheduling unit 103, and a beam pattern determination unit 111. The antenna 109 transmits and receives wireless radio waves to and from terminals. The backhaul interface 101 is connected to a connection line to the router. The upper layer processing unit 102 is connected to the backhaul interface 101. The units 106 and 107 are connected to the switch 108. The antenna gain adjustment unit 112 adjusts transmission power of each antenna and transports data of each frequency band to the antenna. The scheduling unit 103 is connected between the upper layer control unit 102 and the Downlink baseband processing unit 104. The beam pattern determination unit 111 changes the transmission power of each antenna in each frequency band, and determines the beam pattern. The base station 20b performs communication in plural frequency bands. The Downlink baseband processing unit 104, the Uplink baseband processing unit 105, the transmitter RF unit 106, the receiver RF unit 107, and the switch 108 are processed in each frequency band 113. The antenna gain adjustment unit 112 and the beam pattern determination unit 111 in the base station 20b change the transmission power of each frequency band of each antenna based on interference information. Parts that parallelly perform processing in each frequency band 113 are not limited to these, as long as communication is performed in plural frequency bands.

Figure 1:
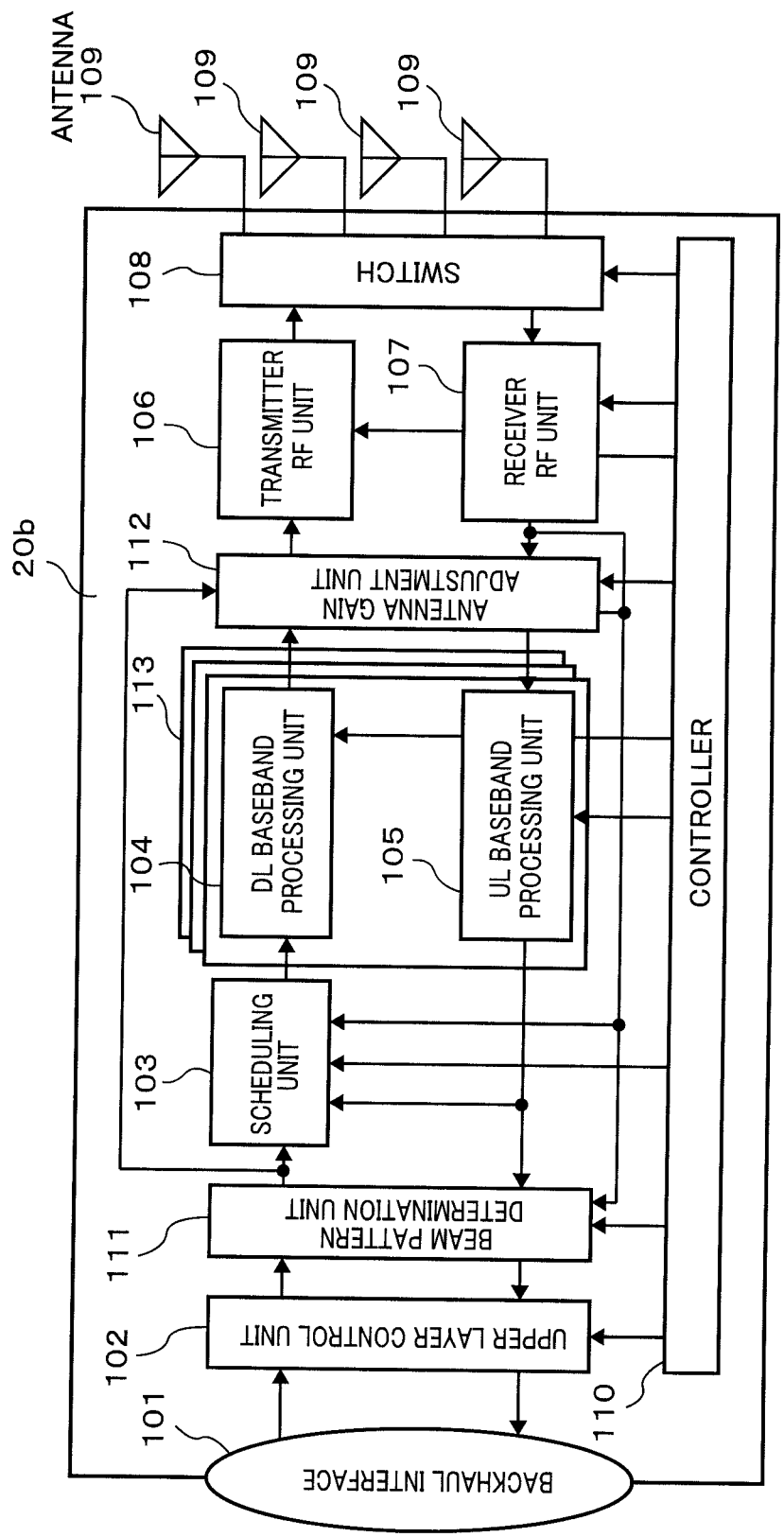
FIG. 1 is a diagram showing software and a block diagram of a base station according to a first embodiment.

In the functional block structure of this embodiment shown in FIG. 1, in the Downlink (DL), data transmitted from the backhaul interface 101 is processed by the upper layer control unit 102. The beam pattern determination unit 111 determines the beam pattern of each frequency band, using information regarding a neighbor base station from the upper layer control unit 102, an interference reporting value from the Uplink baseband processing unit 105, or information regarding the receiver RF unit 107 or antenna gain adjustment unit 112. The beam pattern determination unit 111 will later specifically be described with reference to FIG. 10.

The scheduling unit 103 measures reception quality of each slot, using service information from the upper layer control unit 102, a signal from the receiver RF unit 107, a signal from the Uplink baseband processing unit 105, and beam pattern information from the beam pattern determination unit 111. Then, the unit 103 determines the Downlink and Uplink resource assignment. The information to be used by the scheduling unit 103 is not limited to these, and may be any other information from another processing unit.

After that, the data corresponding to the plural frequency bands 113 is moved to the Downlink baseband processing unit 104, and is RF processed by the transmitter RF unit 106.

The switch 108 is switched to the transmitter side, the antenna gain adjustment unit 112 transports the signal to each antenna, and adjusts the transmission power of each antenna 109. Then, a wireless signal is transmitted from the antenna 109. This process is operated in accordance with a control signal from the controller 110.

Figure 7:
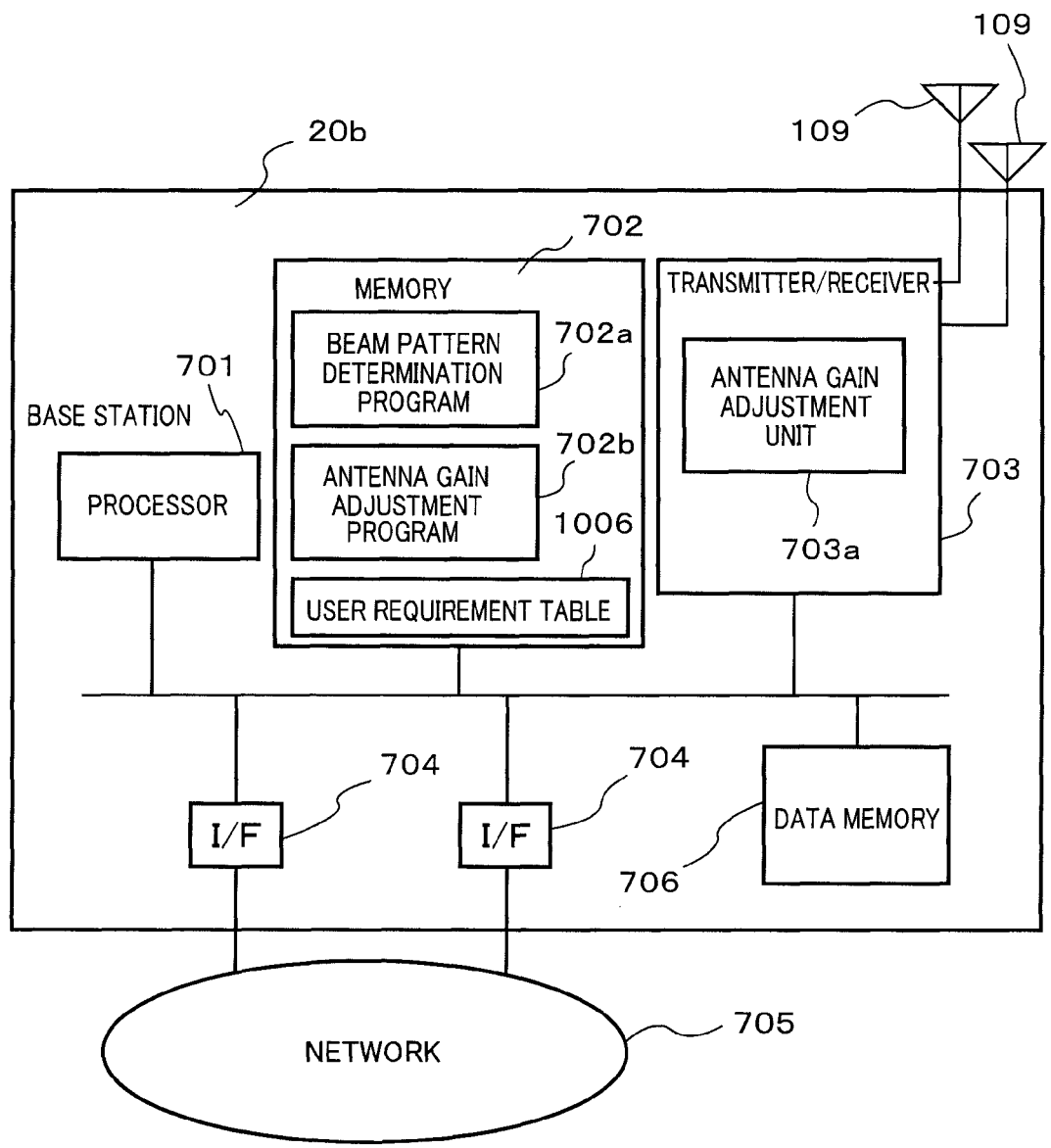
FIG. 7 is a diagram showing an example of a hardware/block structure of a base station, in the first embodiment.

Descriptions will now be made to an example of a device configuration of the base station 20b according to the first embodiment, using the block diagram shown in FIG. 7.

In the functional block of FIG. 1, the transmitter RF unit 106, the receiver RF unit 107, the switch 108, the antenna 109, and the antenna gain adjustment unit 112 are stored in a transmitter/receiver unit 703 that transmits and receives wireless signals, and the backhaul interface 101 is stored in an I/F 704 and connected to a network 705. Other functional blocks are program modules executed by a processor 701, and program modules are stored in a memory 702. The beam pattern determination unit 111 determines transmission power of each antenna in each frequency band, with reference to various tables formed in a data memory 706, as will be described later. The antenna gain adjustment unit transports a transmission signal to the antenna to adjust the transmission power of each antenna element, to attain the transmission power determined by the beam pattern determination unit 111.

In the Uplink (UL), the switch 108 is switched to the receiver side, and a wireless signal is received by the antenna 109. The weight of the received data is adjusted by the antenna gain adjustment unit 112. The adjusted data is RF processed by the receiver RF unit 107. Then, the data is moved to the Uplink baseband processing unit 105, processed by the upper layer control unit 102, and transmitted from the backhaul interface 101. This process is operated in accordance with a control signal from the controller 110. The processes executed by the controller 110 of FIG. 1 correspond to the program modules executed by the processor 701.

Figure 8:
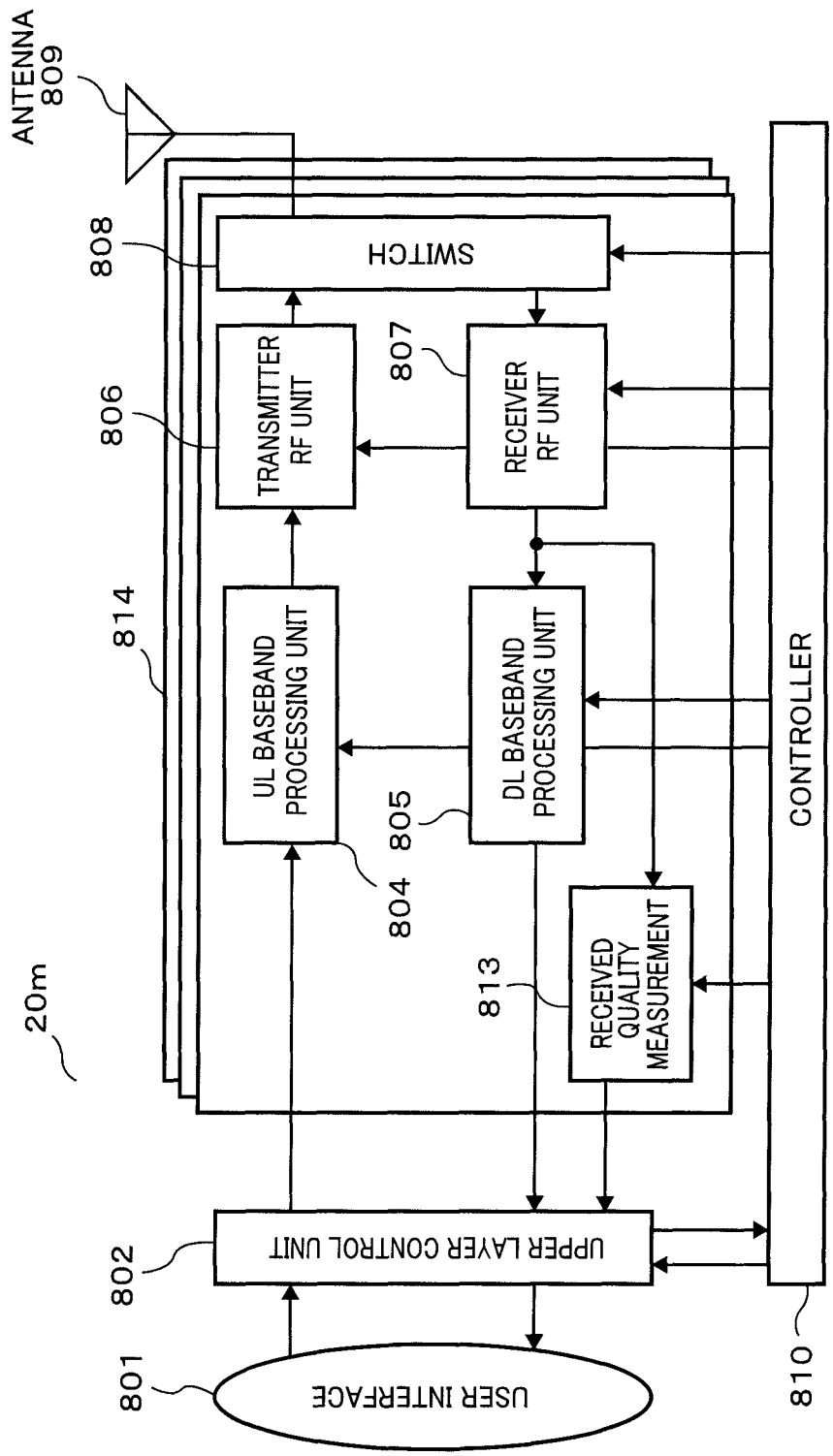
FIG. 8 is a diagram showing an example of a software/block structure of a terminal, in the first embodiment.

FIG. 8 is a block diagram showing an example of the terminal 20 m, in this embodiment.

The terminal 20 m includes a controller 810, an antenna 809, a switch 808, an upper layer processing unit 802, a transmitter RF unit 806 and a receiver RF unit 807, an uplink baseband processing unit 804, and a downlink baseband processing unit 805. The antenna 809 transmits and receives wireless radios to and from base stations. The switch 808 is to switch between transmission and reception, and connected to the antenna 809. The upper layer processing unit 802 is connected to a user interface 801. The RF units 806 and 807 are connected to the switch 808. The uplink baseband processing unit 804 is connected between the upper layer processing unit 802 and the transmitter RF unit 806. The downlink baseband processing unit 805 is connected between the upper layer processing unit 802 and the receiver RF unit 807. Further, the terminal 20 m includes a received quality measurement unit 813 which is connected between the upper layer processing unit 802 and the receiver RF unit 807.

In the uplink (UL), data transmitted from a user interface 905 is processed in the upper layer processing unit 802. The data is moved to the uplink baseband processing unit 804, and then RF processed in the transmitter RF unit 806. The switch 808 is switched to the transmitter side, and a wireless signal is transmitted from the antenna 809. This process is operated in accordance with a control signal from the controller 810.

In the downlink (DL), the switch 808 is switched to the receiver side, and a wireless signal is received by the antenna 809. The signal is RF processed in the receiver RF unit 807. After that, the data is moved to the downlink baseband processing unit 805, processed in the upper layer control unit 802, and then output to the user interface 801. The received quality measurement unit 813 measures the received quality, and transmits the measurement to the upper layer control unit 802. This process is operated in accordance with a control signal from the controller 810. The controller 810 has a function for transmitting frame configuration information to be transmitted through the downlink, to each processing unit. The user interface is not limited to this, and may be any other unit. The terminal performs processing for each of plural frequency bands 814, like the base station.

Figure 9:
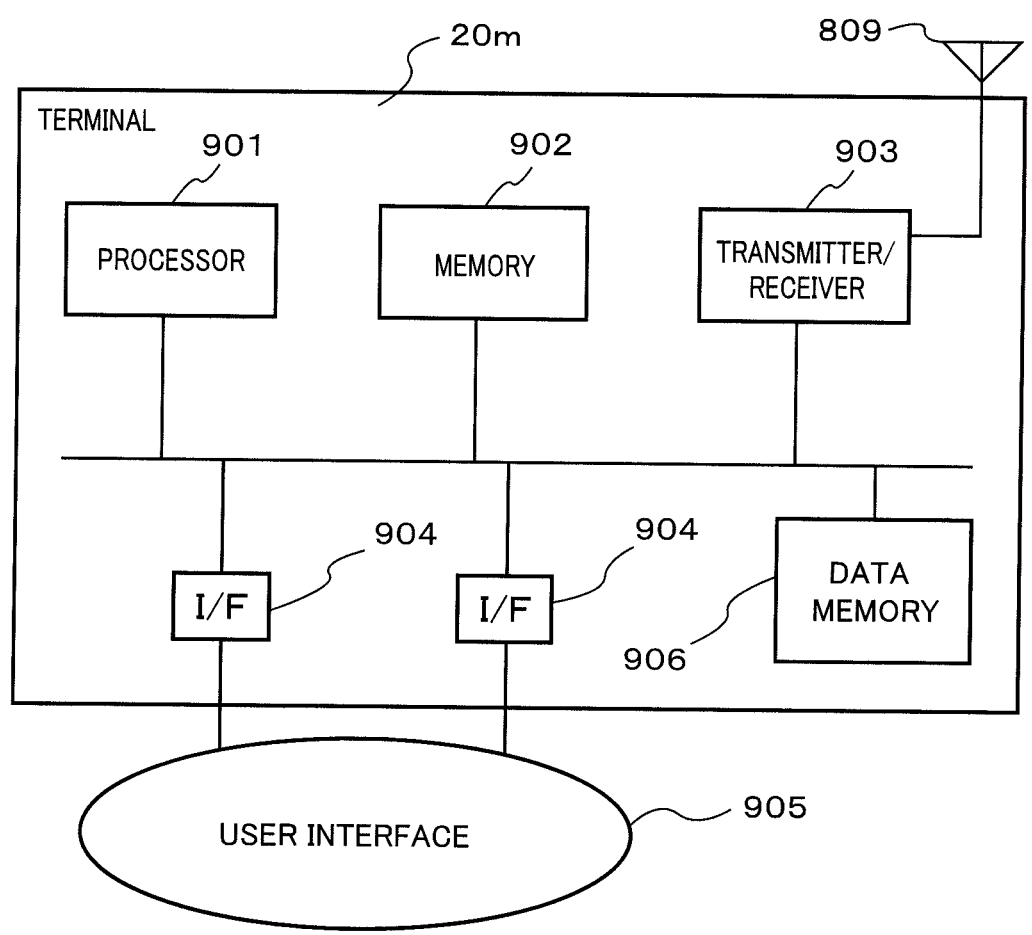
FIG. 9 is a diagram showing an example of a hardware/block structure of a terminal, in the first embodiment.

FIG. 9 shows an example of a hardware configuration of the terminal 20 m. The transmitter RF unit 806, the receiver RF unit 807, the switch 808, and the antenna 809 of the Advanced terminal of FIG. 8 are stored in a transmitter/receiver unit 803 which transmits and receives a wireless signal. The interface 801 is stored in an I/F 904, and is connected to a user interface 905. Other functional blocks are program modules executed by a processor 901. The program modules are stored in a memory 902, and are operated in accordance with data from the user interface 905.

The processes executed by the controller 810 correspond to the program modules executed by the processor 901.

Figure 10:
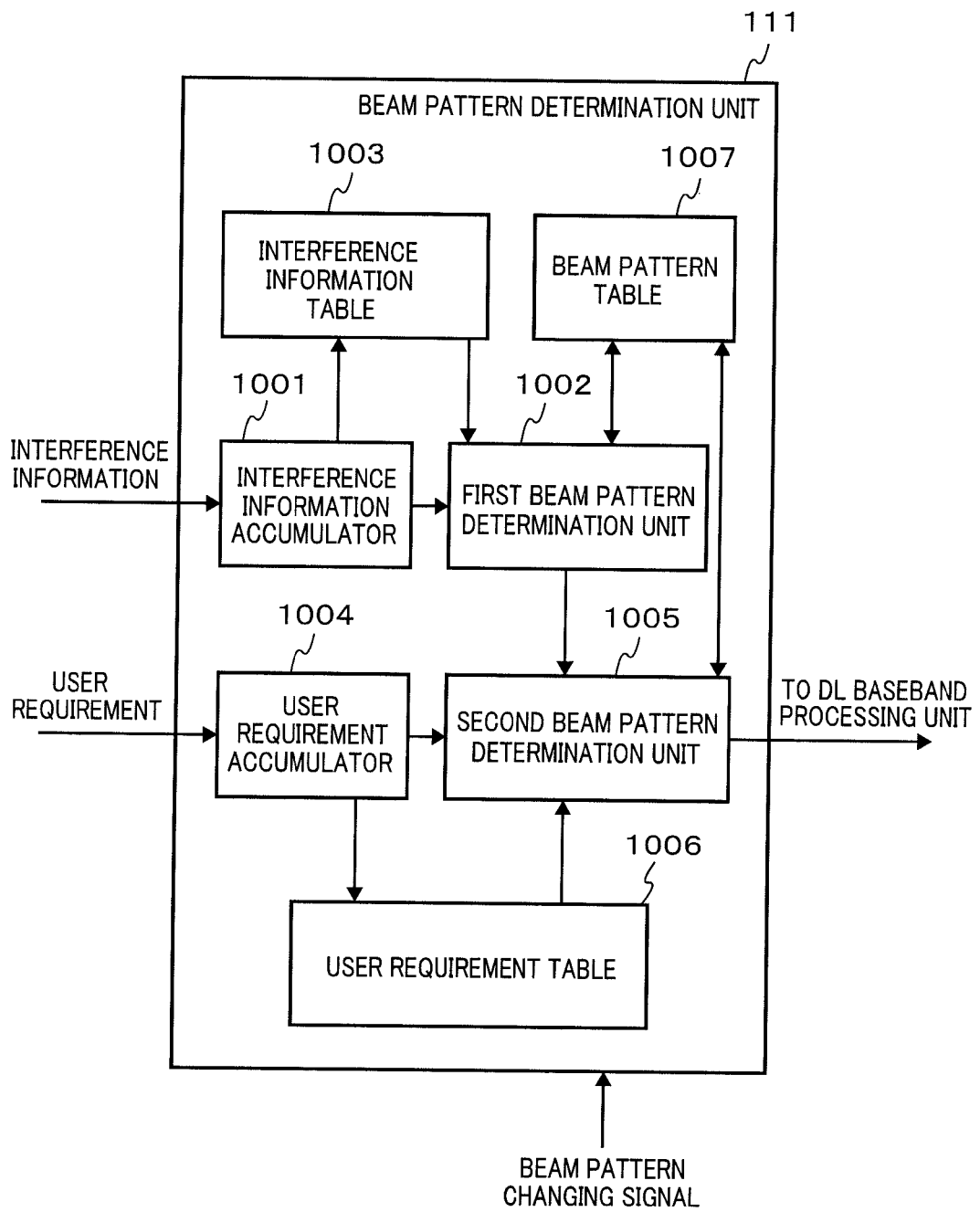
FIG. 10 is a block diagram showing a beam pattern determination unit 111, according to the first embodiment.

FIG. 10 shows a block structure specifically showing an embodiment of the beam pattern determination unit 111. The interference that the base station or terminal is subject to may differ depending on the frequency band, the load of the neighbor base station, and the direction. Because suitable beams differ based on a user requirement, the beam patterns are changed between the frequency bands.

In FIG. 10, the beam pattern determination unit 111 includes an interference information accumulator 1001, an interference information table 1003, a first beam pattern determination unit 1002, a user requirement accumulator 1004, a user requirement table 1006, a second beam pattern determination unit 1005, and a beam pattern table 1007. Specifically, the accumulator 1001 accumulates interference information reported from the terminal. The interference information table 1003 stores the accumulated interference information. The determination unit 1002 determines the beam pattern for minimizing the interference based on the interference information. The accumulator 1004 accumulates a communication requirement of the terminal. The table 1006 stores the accumulated requirement information. The determination unit 1005 further changes the beam pattern determined by the first beam pattern 1002, to satisfy the accumulated user requirement information. The table 1007 stores the determined beam pattern.

The interference information accumulator 1001 operates, upon reception of interference information reported from the terminal to the base station and transmitted from the uplink baseband processing unit 105. The user requirement accumulator 1004 operates upon reception of a communication requirement of the terminal that is transmitted from the uplink baseband processing unit 105.

The first beam pattern determination unit 1002 and the second beam pattern determination unit 1005 operate, upon reception of a beam pattern changing signal transmitted from the controller 110. The beam pattern changing signal may be transmitted at predetermined intervals, or may be transmitted when interference or user requirement exceeds a predetermined threshold value. The interference information accumulator 1001, the user requirement accumulator 1004, the first beam pattern determination unit 1002, and the second beam pattern determination unit 1005 exist as a beam pattern determination program 702a as one of program modules in the memory 702 of the base station shown in FIG. 7. The interference information table 1003 and the user requirement table 1006 are stored in the data memory 706 of the base station.

Descriptions will now be made to functional operations of the beam pattern determination unit 111 in the base station of this embodiment. The interference information accumulator 1001 of FIG. 10 accumulates interference information reported from the terminal, and stores the information in the interference information table 1003.

Figure 12:
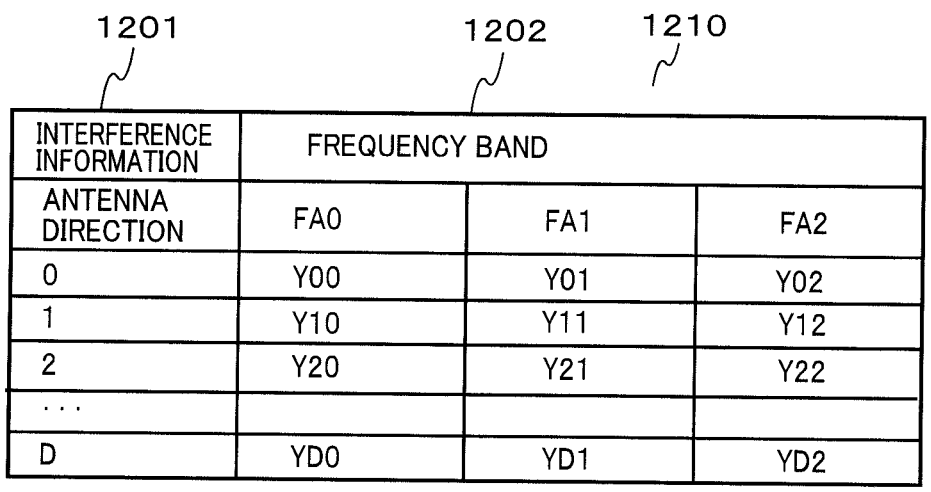
FIG. 12 is a diagram showing a composition of an interference information table, according to the first embodiment.

FIG. 12 shows an example of the interference information table. An interference information table 1210 is stored in the data memory 706 of the base station. A column "antenna direction" 1201 specifies an antenna number in an interference direction, while a column "frequency band" 1202 specifies the frequency band that is subject to the interference, and stores interference power of each frequency band in each antenna direction.

Figure 11:
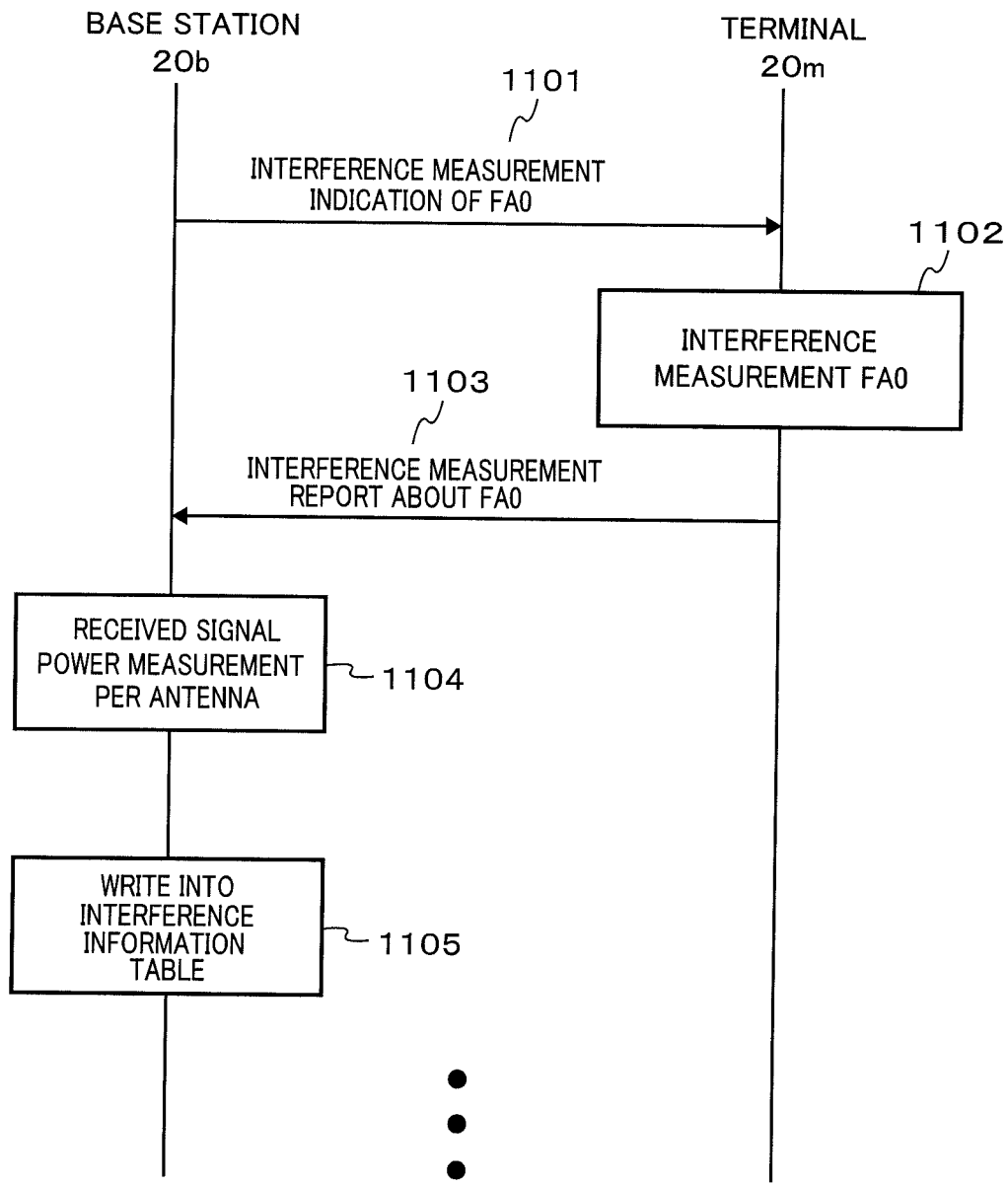
FIG. 11 is a diagram showing a sequence of reporting interference information, according to the first embodiment.

FIG. 11 shows a sequence of collecting interference information. In step 1101, the base station 20b instructs the terminal to measure the interference in the frequency band "FA0". In step 1102, the terminal 20 m measures the interference in the frequency band "FA0", in response to the instruction from the base station. In step 1103, the terminal reports the base station 20b about the interference information measured by the terminal.

In step 1104, the base station 20b measures the terminal reception power of each antenna, to estimate in which direction the terminal received the report is interfered. This operation is performed inside the antenna gain adjustment unit 112, as will be described later. The antenna gain adjustment unit 112 measures the received power of each antenna and the received power of each sub-carrier in each frequency band. After passing through the uplink baseband processing unit 105, it is distinguishable from which terminal the sub-carrier is transmitted. Thus, the received power of each antenna can be measured using the information.

The method for measuring the received power of each antenna is not limited to this, and may be any method for obtaining the received power of each antenna by identifying the terminal. For example, a corresponding terminal may be estimated by controlling only the terminal to perform Uplink transmission at a time the terminal is made to report the interference information.

In step 1105, the interference information accumulator 1001 performs writing of data into the interference information table 1003.

This sequence is not limited to the above, and may be any other sequence as long as the base station controls the terminal to report the interference information in each frequency band so as to acquire the interference direction and interference power.

Figure 13:
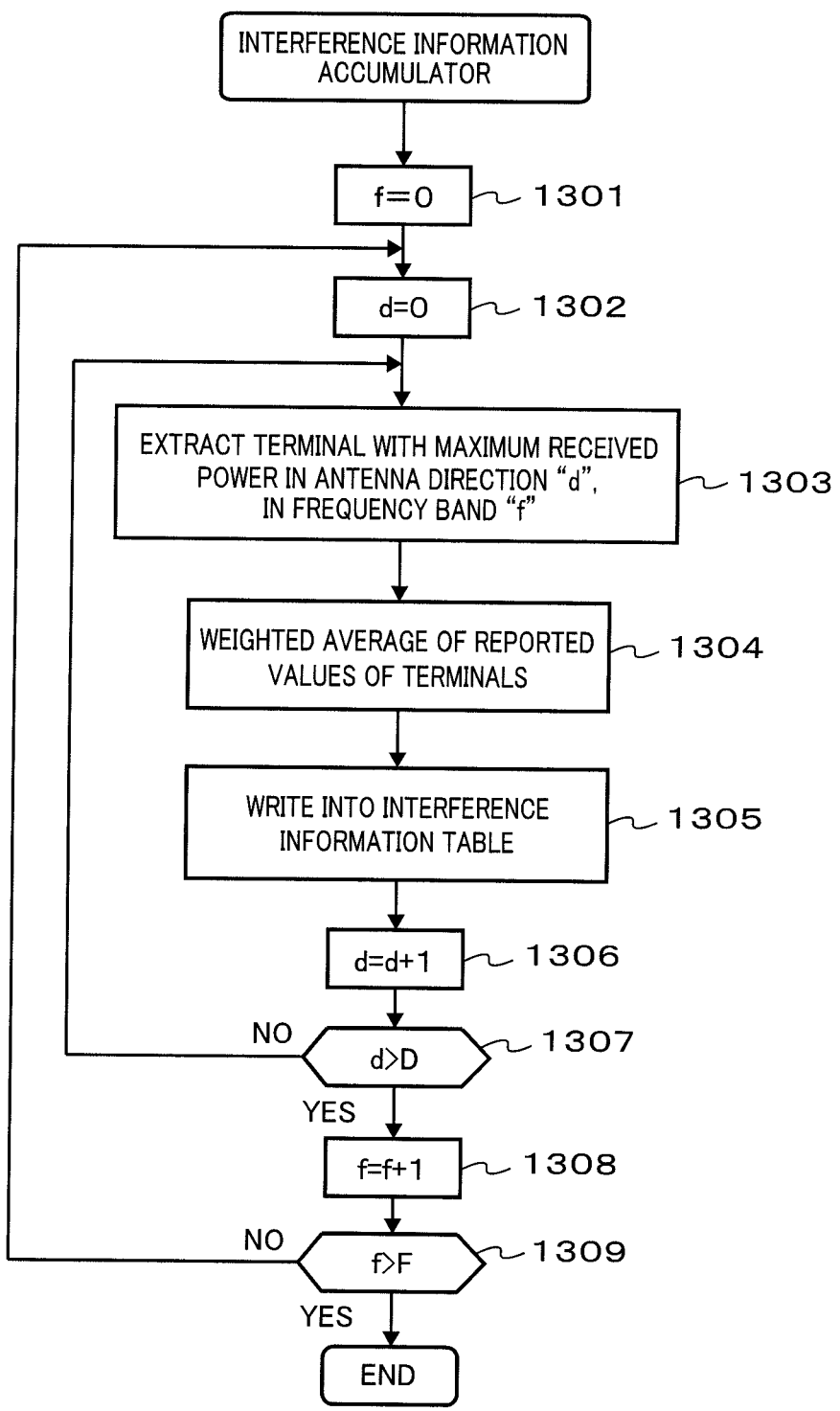
FIG. 13 is a diagram showing a flowchart of an interference information accumulator, according to the first embodiment.

FIG. 13 shows the flowchart of the interference information accumulator 1001. In step 1301, the number of frequency bands to be accumulated is initialized as f=0. In step 1302, the antenna direction to be accumulated is initialized as d=0. In step 1303, the accumulator 1001 extracts a terminal with the maximum received power in antenna direction "d" compared to the powers in other antenna directions, in frequency band "f". In step 1304, the accumulator 1001 obtains a weighted average of the interference information reported from the terminal extracted in step 1301 by Equation 1.

Equation 1

$$Y\_df = w\_0 * |0 + w\_1 * |1 + \ldots + w\_N * |\_N \quad \text{Equation 1}$$

Note "I_weight_f" represents interference information including the weighted average of the frequency band "f", "w_i" represents a weight of a terminal i, "I_i" represents interference information of the terminal i, and "N" represents the total number of terminals. The interference information measured by the terminal has a higher accuracy in a position of the cell edge than the accuracy in the center position of the cell. Thus, the terminal in the cell edge is given a greater weight than the terminal(s) in the center. The method for estimating the terminal location can be realized based on a difference between, for example, the transmission power of the terminal and the received power of the base station. The method for taking a weighted average is not limited to this, and may be any another method as long as the reported interference information of each of terminals is averaged. For example, the reported values of the terminal extracted in step 1303 may be averaged for a predetermined time.

In step 1305, the accumulator 1001 writes the interference information averaged in step 1304 into the columns of "antenna direction d" and "frequency band f" of the interference information table 1003. In step 1306, the antenna direction "d" to be searched is incremented. In step 1307, when the entire antenna directions are completely searched yet, the flow returns to step 1303. When the entire antenna directions are completely searched, the flow proceeds to step 1308. In this case, the total number of antenna elements is "D". In step 1308, the frequency band "f" to be searched is incremented. In step 1309, when the entire frequency bands to be searched are not completely searched, the flow returns to step 1302. When the entire frequency bands are completely searched, the process ends. Note that the total number of frequency bands is "F".

The flowchart of FIG. 13 is not limited to the above, and may be made in another form as long as the interference information of antenna directions and frequency bands are accumulated and stored in the interference information table 1003. For example, in step 1303, instead of finding the antenna direction corresponding to the maximum received position, the reported interference information may be weighted to obtain the interference information of a corresponding terminal corresponding in association with each antenna, based on the received power of each antenna.

The first beam pattern determination unit 1002 of FIG. 10 refers to the interference information table 1003, and changes the received power of each antenna in each frequency band to lower the transmission power of an antenna in an antenna direction with great interference.

Figure 14:
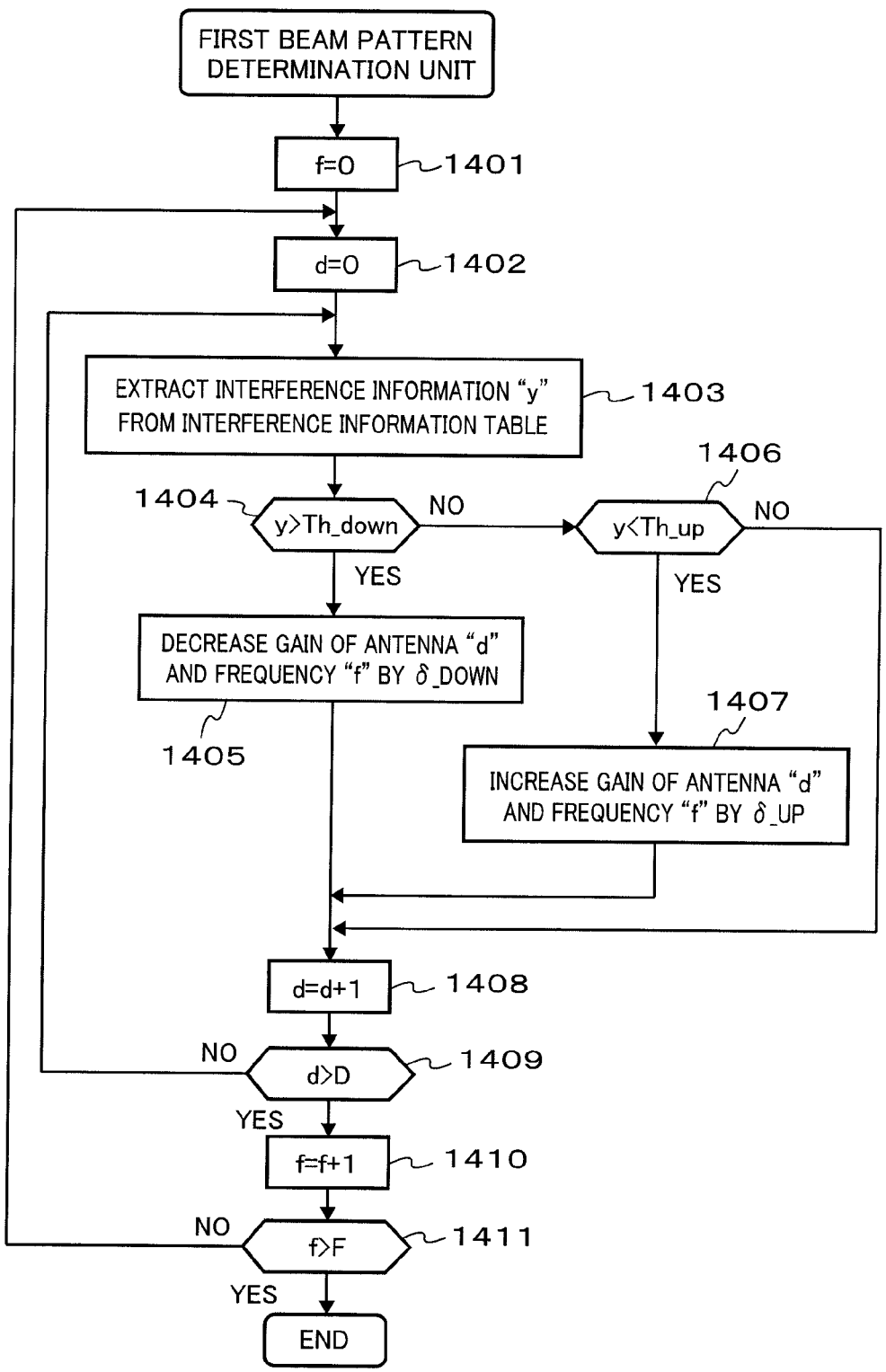
FIG. 14 is a diagram showing a flowchart of a first beam pattern determination unit, according to the first embodiment.

FIG. 14 shows an example of a process flowchart of the first beam pattern determination unit 1002. In step 1401, the frequency band number corresponding to the beam pattern to be changed is initialized as f=0.

In step 1402, the antenna direction corresponding to the beam pattern to be changed is initialized as d=0. In step 1403, the determination unit 1002 refers to the interference information table 1003 to extract interference information "γ" corresponding to the antenna direction "d" and the frequency band "f". In step 1404, when the interference is greater than a threshold value, that is, when "γ_df>Th_down", the determination unit 1002 determines that the interference in the corresponding antenna direction is great. In step 1405, the determination unit 1002 lowers the transmission power of the antenna in the corresponding antenna direction and the corresponding frequency band by "δ_down[dB]". On the contrary, when the interference is lower than a threshold value, that is, when "γ_df<Th_down", the flow moves to step 1406.

In step 1406, when the interference is lower than a threshold value, that is, when "γ_df<Th_up", the determination unit 1002 determines that the interference in the corresponding antenna direction is low. In step 1407, the transmission power of the antenna in the corresponding antenna direction and in the frequency band is increased by "δ_up[dB]". When the interference value is greater than a threshold value, that is, when "γ_df>Th_up", the transmission power of the antenna is not changed, and the flow moves to step 1408.

The transmission power of the antenna that has been changed in step 1405 and step 1407 is stored in the beam pattern table 1007. The beam pattern table 1007 is shown in FIG. 15. A column "antenna direction" 1501 represents an antenna number for adjusting the transmission power, a column "frequency band" 1502 represents the frequency band for adjusting the transmission power. The table 1007 stores the antenna directions and the transmission powers of antennas in the frequency bands.

In step 1408, the antenna direction "d" for changing the transmission power of the antenna is increased. In step 1409, when the process for the entire antenna directions is not completed yet, the flow returns to step 1403. When the process for the entire antenna directions is completed, the flow proceeds to step 1410. In step 1410, the frequency band "f" for changing the transmission power of the antenna is incremented. In step 1411, when the process of the entire frequency bands is not completed yet, the flow returns to step 1402. When the process of the entire frequency bands is completed, the process ends.

The first beam pattern determination unit is not limited to the above, as long as it decreases the transmission power with high interference in a certain frequency band and antenna direction based on the interference information, and increases the transmission power with low interference in a certain frequency band and antenna direction. For example, the transmission power may arbitrarily be determined based on interference information values. For example, it may be determined that the antenna direction and frequency band corresponding to high interference information are not used. This high interference information exceeds a predetermined threshold value.

The beam pattern determination unit 111 of FIG. 1 further changes the beam pattern based on user requirement information. The user requirement accumulator 1004 of FIG. 10 stores the user requirement information in the user requirement table 1006.

FIG. 16 shows an example of the user requirement table 1006. A column "terminal number" 1601 indicates a terminal number connected to the base station, and a column "user requirement information" 1602 stores requirement information, such as a QoS of each terminal. The user requirement information is extracted from requirement values from the network or terminals. The column "user requirement information" 1602 indicates "minimum required rate Rmin_i", "maximum sustained rate Rmax_i", and "remaining capacity of buffer B_i" for transmission to terminals. The user requirement information is not limited to these, and may be any other information as long as communication requirements from users is indicated.

Figure 17:
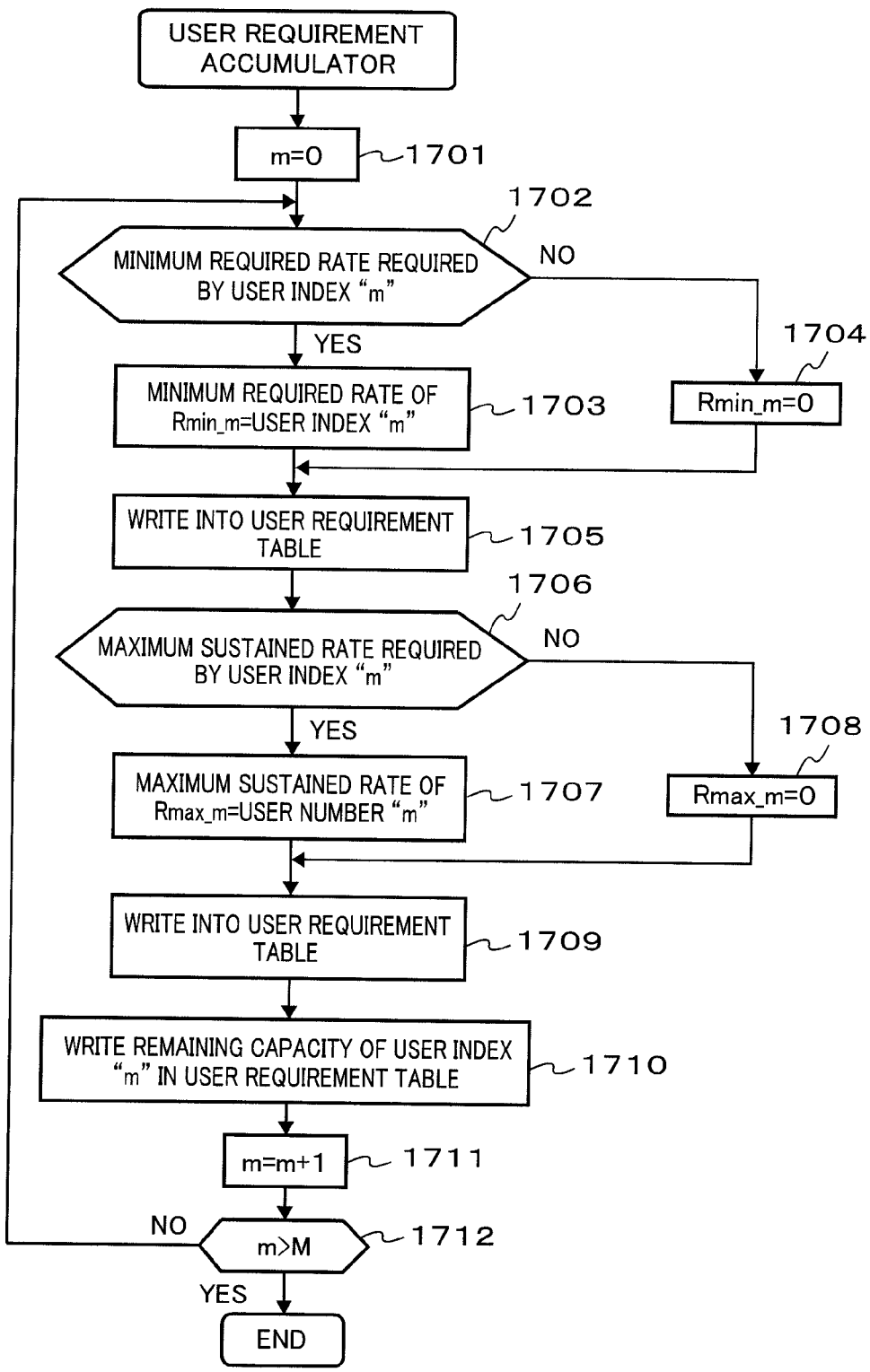
FIG. 17 is a diagram showing a flowchart of a user requirement accumulator, according to the first embodiment.

FIG. 17 is a flowchart of the user requirement accumulator 1004.

In step 1701, the number of terminal to be accumulated is initialized as m=0.

In step 1702, when the minimum required rate is required from a terminal having a terminal number "m", the required minimum required rate is replaced in Rmin_m in step 1703. When there is no requirement of the minimum required rate from the terminal number "m", "Rmin_m=0" is set in step 1704.

In step 1705, "Rmin_m" is stored in the column "minimum required rate" in the user requirement information of the user requirement table 1006.

In step 1706, when the maximum sustained rate is required from the terminal number "m", the required maximum sustained rate is replaced in "Rmax_m" in step 1707. When there is no requirement of the maximum sustained rate from the terminal number "m", "Rmax_m=0" is set in step 1708.

In step 1709, "Rmax_m" is stored in the column "maximum sustained rate" in the column "user requirement information" 1602 of the user requirement table 1006.

In step 1710, the remaining capacity of buffer of the terminal number "m" is stored in the column "buffer" in the column "user requirement information" 1602 of the user requirement table 1006.

In step 1711, the terminal number to be accumulated is incremented.

In step 1712, when the entire terminals are not completely accumulated, the flow returns to step 1702. When the entire terminals are completely accumulated, the process ends.

The user requirement accumulator 1004 is not limited to this, and may be any other unit as long as it stores user requirement information in the user requirement table 1006.

The second beam pattern determination unit 1005 of FIG. 10 refers to the use requirement table 1006 and the beam pattern table 1007 storing the beam pattern that is once determined by the first beam pattern determination unit. Based on the referred information, the unit 1005 updates the beam pattern for enabling to receive signals from many antennas and for setting a neighbor antenna element in the same frequency band, when a requirement value of a terminal is very high. This neighbor antenna element should be adjacent to the terminal as much as possible.

Figure 18:
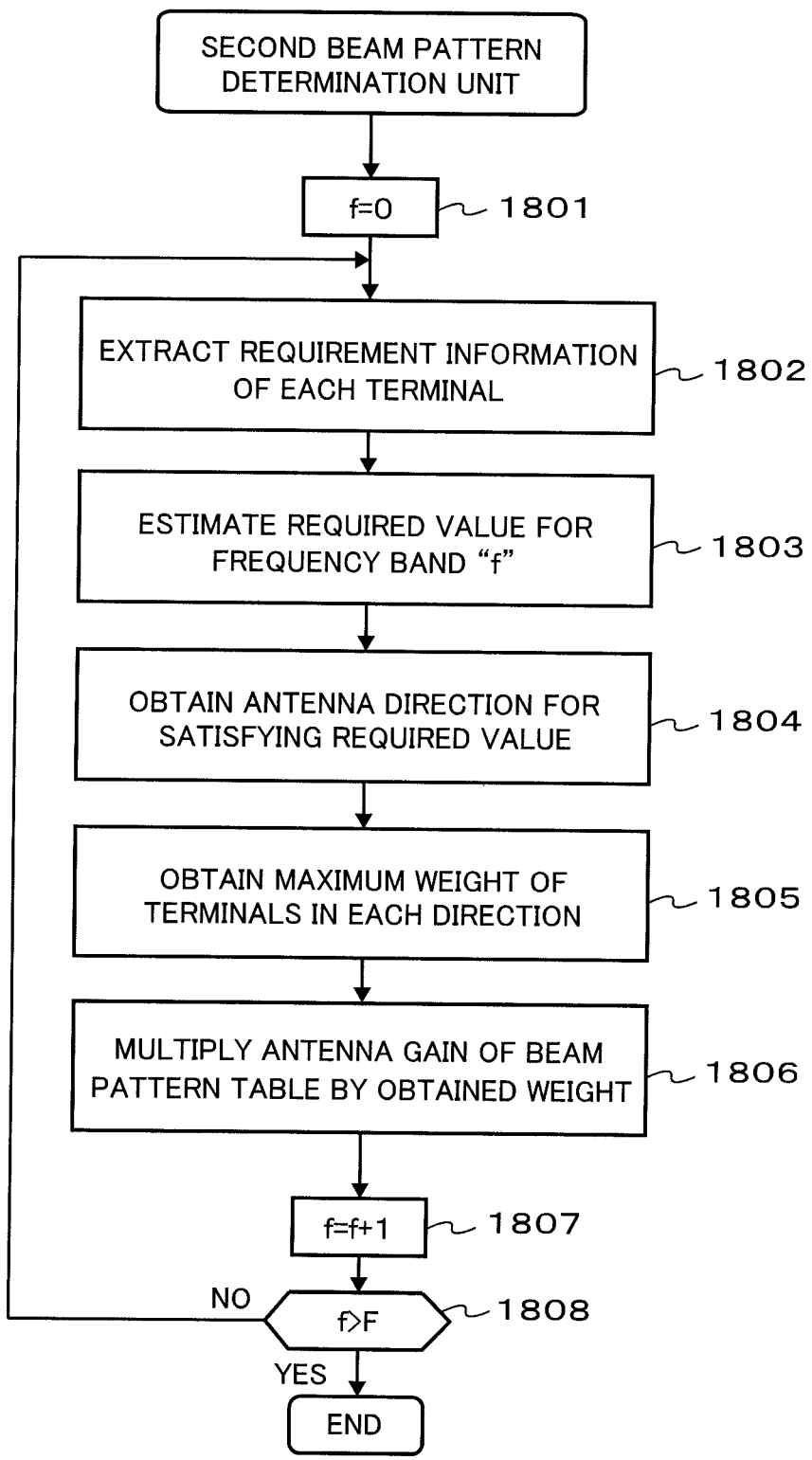
FIG. 18 is a diagram showing a flowchart of a second beam pattern determination unit, according to the first embodiment.

FIG. 18 shows an example of the process flowchart of the second beam pattern determination unit 1005. In step 1801, the frequency band for changing the transmission power of the antenna is initialized as f=0. In step 1802, the determination unit 1005 refers to the user requirement table 1006 to extract the minimum required rate "Rmin_I" (i=0, 1, ..., M) as requirement information of each terminal. In this case, "i" represents a terminal number. Note that the terminal requirement information is not limited to this, as long as it is stored in the terminal requirement table.

In step 1803, the extracted information is converted into a required value "Rreq_if" for satisfying the user requirement information in the frequency band "f". "Rreq_if" is obtained by Equations 2 and 3, when the frequency band that a terminal "i" is currently connected to is FA_Wi (when "Wi" is the number of the frequency band connected to the terminal "i"), and when the number of elements of "Wi" is K_i.

Equation 2

$$Rreq\_if = Rmin\_i/K\_i \text{ (when "f" belongs to } FA\_Wi)$$  Equation 2

Equation 3

$$Rreq\_if = 0 \text{ (when "f" does not belong to } FA\_Wi)$$  Equation 3

Note that the required value is not limited to the above, and may be any other value as long as it can be used for converting the user requirement information extracted in step 1802 into a value corresponding to the requirement information of the corresponding frequency band. For example, of the connected frequency bands, a high required value may be set in a frequency band with received high-quality, while a low required value may be set in a frequency band with received low-quality.

In step 1804, a weight "v_kJ" (j=0, 1, ..., D) ("k" is a terminal number) of each antenna necessary for satisfying the required value (obtained in step 1803) is obtained. In consideration MIMO, the transmission of multiplexed streams to the terminal achieves high throughput. For example, for two antennas, two-stream multiplexing can be made at the maximum, while for four antennas, four-stream multiplexing can be made at the maximum. Logically, the throughput is improved up to two times. That is, the more the number of antennas that are visible from the terminal, the higher the throughput. The number of antennas "P_k" necessary for a terminal "k" can be obtained by Equation 4, when "q" is the number of terminals with a required value of not "0", and when "T_k" (k is a terminal number with a required value of not "0") is the throughput of the terminal that can be attained with one stream using the entire wireless resources in a frequency band "f". In this case, the terminal has a required value of not "0".

Equation 4

$$P\_k = \text{ceil}(Rreq\_kf/(T\_k/Q))$$  Equation 4

"ceil (x)" is a function for returning the minimum integer that exceeds "x". It is estimated that two antennas are necessary for the terminal "k", since a two-stream transmission of 12 Mbps is assumed to be attained, for example, when the required value is 10 Mbps, and T_k=6 Mbps. The weight v_kj of each antenna is set as "v_kj=1" so that a corresponding antenna is used until the number of antennas reaches "P_k" in the order of high received power of each antenna element of the terminal "k". In addition, "v_kj=0" corresponding to any antenna over "P_k" is set, because the antenna may not be used. The method for obtaining the weight of antennas is not limited to this, and any other method as long as it is for estimating the number of antennas for use in the terminal based on the required value of the terminal, and increasing the weight of antenna elements with high received power from the terminal based on the estimated number of antennas, and for decreasing the weight of an antenna element with low received power. For example, even for the required value that requires at least two streams, more than two streams may be used for the sake of improvement in the received quality. When there is no particular requirement information, the weight of the antenna element may be determined in the above order, up to the maximum number of antennas usable by the base station, in a best effort manner.

In step 1805, the weight "q_jf" is obtained based on the obtained maximum antenna weight of terminals, in each antenna direction. That is, for the terminal with the required value of not "0", "q_jf" is the maximum value of "v_kj" ("k" is the terminal number with the required value of not "0"), in the antenna direction j=0, 1, ..., D. The method for obtaining the weight is not limited to this, and may be any other method as long as a statistical process for antenna weights of terminals is achieved. For example, a high weight may be given to an antenna direction in which terminals with a high weight exist, and a low weight may be given to an antenna direction in which terminals with a low weight exist.

In step 1806, the weight "q_jf" obtained in step 1805 is multiplied by the transmission power in the antenna direction "j" and frequency band "f" of the beam pattern table 1007, so as to update the beam pattern table 1007.

In step 1807, the frequency band for updating the transmission power of the antenna is incremented.

In step 1808, when the process for the entire frequency bands is not completed yet, the flow returns to step 1802. When the process for the entire frequency bands is completed, the process ends.

The second beam pattern determination unit 1005 estimates the necessary number of antennas based on the user requirement information. The second beam pattern determination unit 1005 is not limited to this, and may be any other unit as long as the unit increases the transmission power of an antenna corresponding to an antenna element with high received power from the terminal, does not change the transmission power, or decreases the transmission power of an antenna corresponding to an antenna element with low received power, in accordance with the necessary number of antennas.

Figure 19:
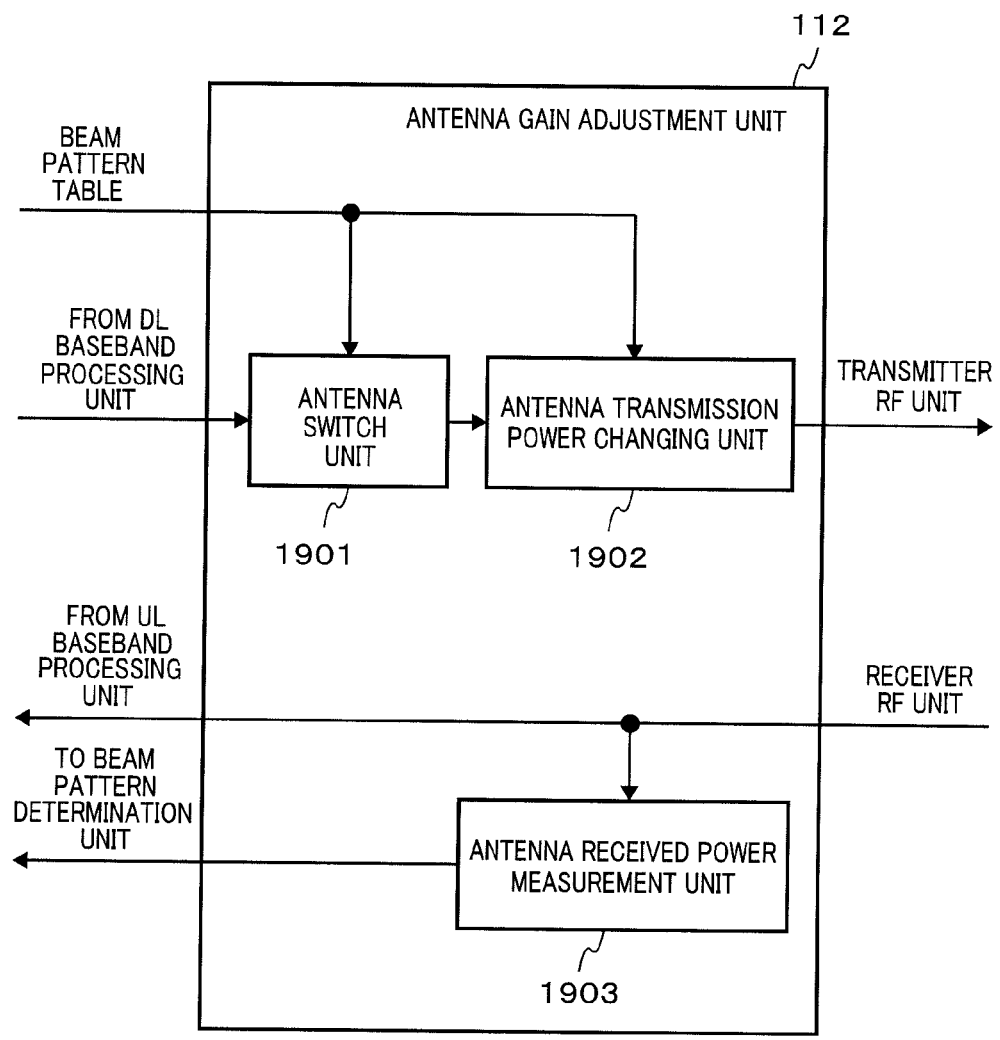
FIG. 19 is a block diagram of an antenna gain adjustment unit 112, according to the first embodiment.

Descriptions will now be made to an example of the antenna gain adjustment unit 112 in the base station shown in FIG. 1. FIG. 19 specifically shows a block structure of the antenna gain adjustment unit 112. The antenna gain adjustment unit 112 transports data of each frequency band to the antennas to control the transmission power, in accordance with the beam pattern determined by the beam pattern determination unit 111. Upon reception of a signal from the terminal via uplink, the adjustment unit measures the received power of the antenna.

In FIG. 19, the antenna gain adjustment unit 112 refers to the beam pattern table 1007 storing the beam pattern determined by the beam pattern determination unit 111. The unit 112 includes an antenna switch unit 1901, an antenna transmission power adjustment unit 1902, and an antenna received power measurement unit 1903. The antenna switch unit 1901 transports the transmission data processed in each frequency band to an antenna for practical use in the transmission. The antenna transmission power adjustment unit 1902 adjusts the transmission power of each antenna. The antenna received power measurement unit 1903 measures the received power of each sub-carrier or a group of sub-carriers in each frequency band with respect to each antenna, for the signal received via uplink.

Figure 20:
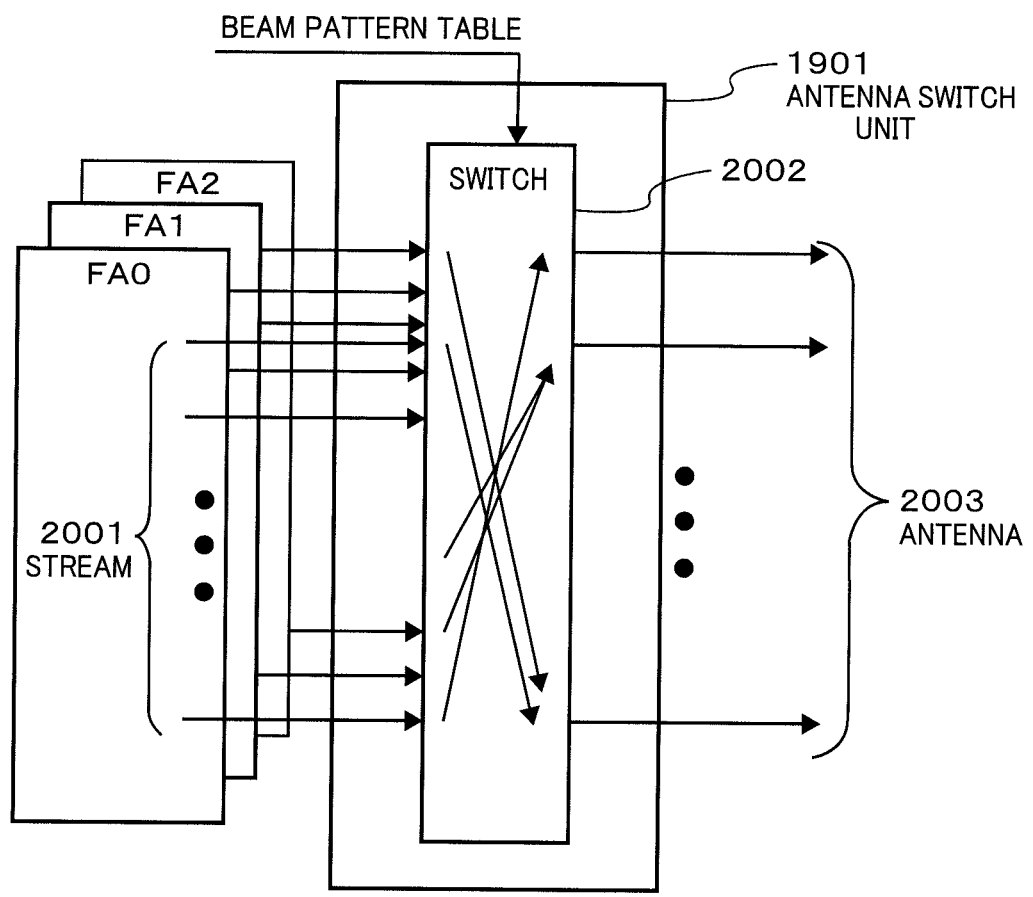
FIG. 20 is a block diagram of an antenna switch unit 111, according to the first embodiment.
Figure 21:
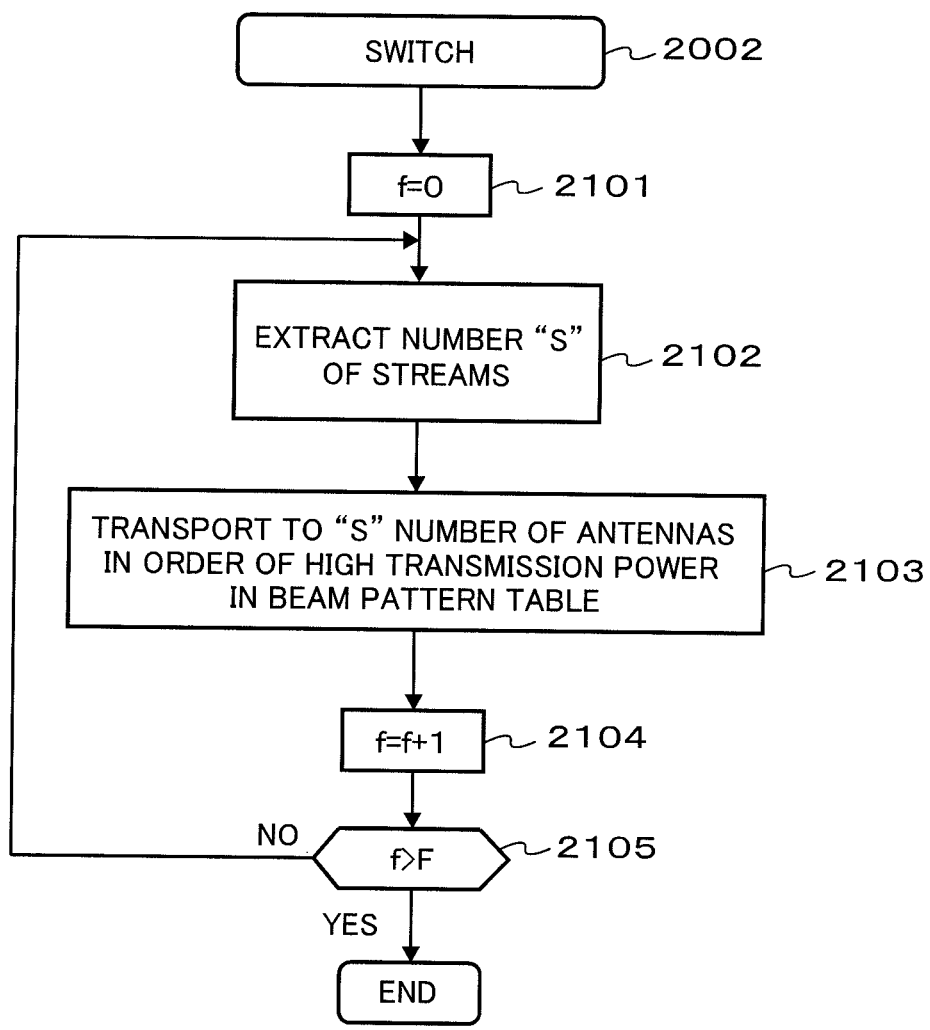
FIG. 21 is a diagram showing a flowchart of a switch 2002, according to the first embodiment.

FIG. 20 shows a block diagram of the antenna switch unit 1901. The antenna switch unit 1901 refers to the beam pattern table 1007 to transport the data processed in each frequency band to each antenna. Plural streams 2001 for using "MIMO" are output in each frequency band. The switch 2002 transports the streams to the antennas, in each frequency band. FIG. 21 shows the flowchart of this process.

In step 2101, each frequency band of data to be transported is initialized.

In step 2102, the antenna switch unit 1901 extracts information representing an "s" number of streams as outputs of the Downlink baseband processing unit 104, that is, information representing the number of assumed antennas for which a transmission process has been performed.

In step 2103, the antenna switch unit 1901 refers to the beam pattern table 1007, and transports the streams to the "s" number of antennas in the order of high-received power. Any antenna corresponding to the received power with the order number below "s" is not used for the transmission in the corresponding frequency band.

In step 2104, the frequency band to be transported is incremented.

In step 2105, when the process of the entire frequency bands is not completed, the flow returns to step 2102. When the process of the entire frequency bands is completed, the process ends.

The antenna switch unit 1901 is not limited to the above, and may be any other unit as long outputs of the Downlink baseband processing unit 104 in each frequency bands are transported to the antennas, in accordance with the transmission power of the beam pattern table 1007.

Figure 22:
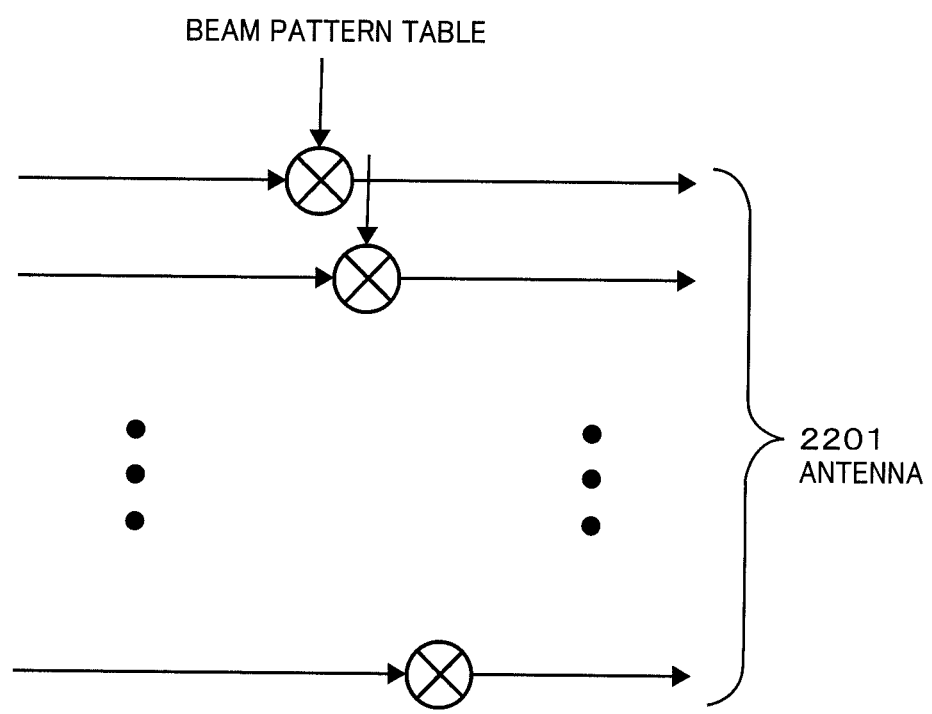
FIG. 22 is a diagram showing a configuration of an antenna transmission power changing unit, according to the first embodiment.

FIG. 22 shows a configuration of the antenna transmission power changing unit 1902. The antenna transmission power changing unit 1902 increments and decrements the transmission power of each frequency band, in accordance with the transmission power of the beam pattern table 1007.

The antenna received power measurement unit 1903 measures the received power of each sub-carrier of each frequency band, for the signal processed by the receiver RF unit. Note, however, that the measurement is performed not only in the unit of sub-carriers, but also in the unit of group of sub-carriers.

The above-described operations for controlling the transmission power of each antenna and frequency band, according to this embodiment, are as follows, with reference to FIG. 23.

Figure 23:
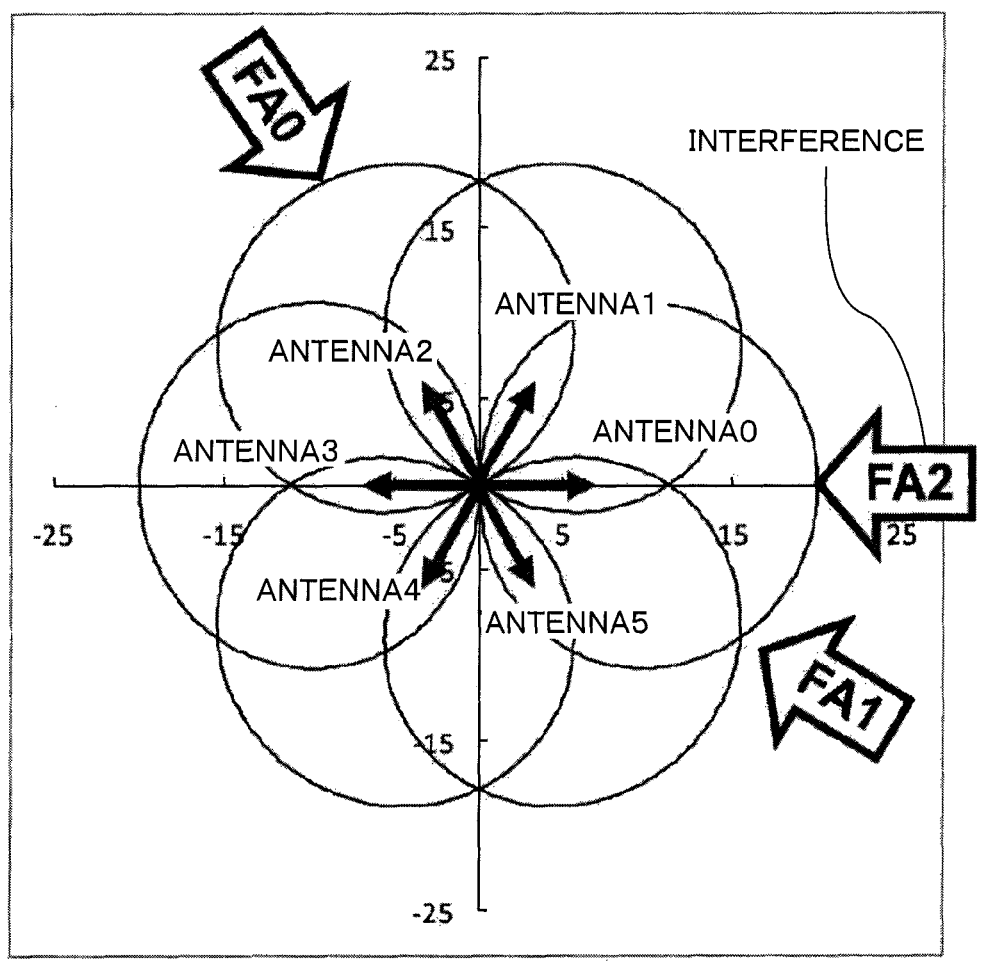
FIG. 23 is a schematic diagram showing the antenna pattern and the interference situation, in the first embodiment.
Figure 24:
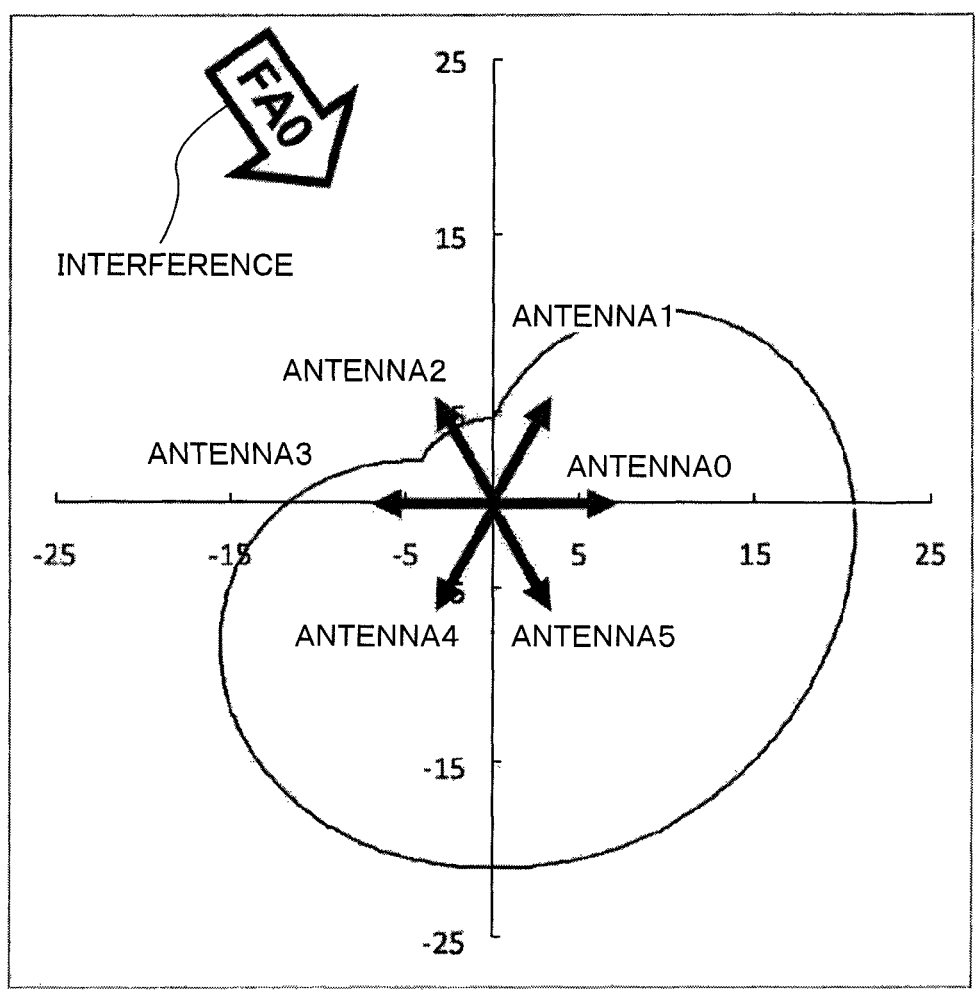
FIG. 24 is a schematic diagram showing the antenna pattern for the interference of "FA0", in the first embodiment.
Figure 25:
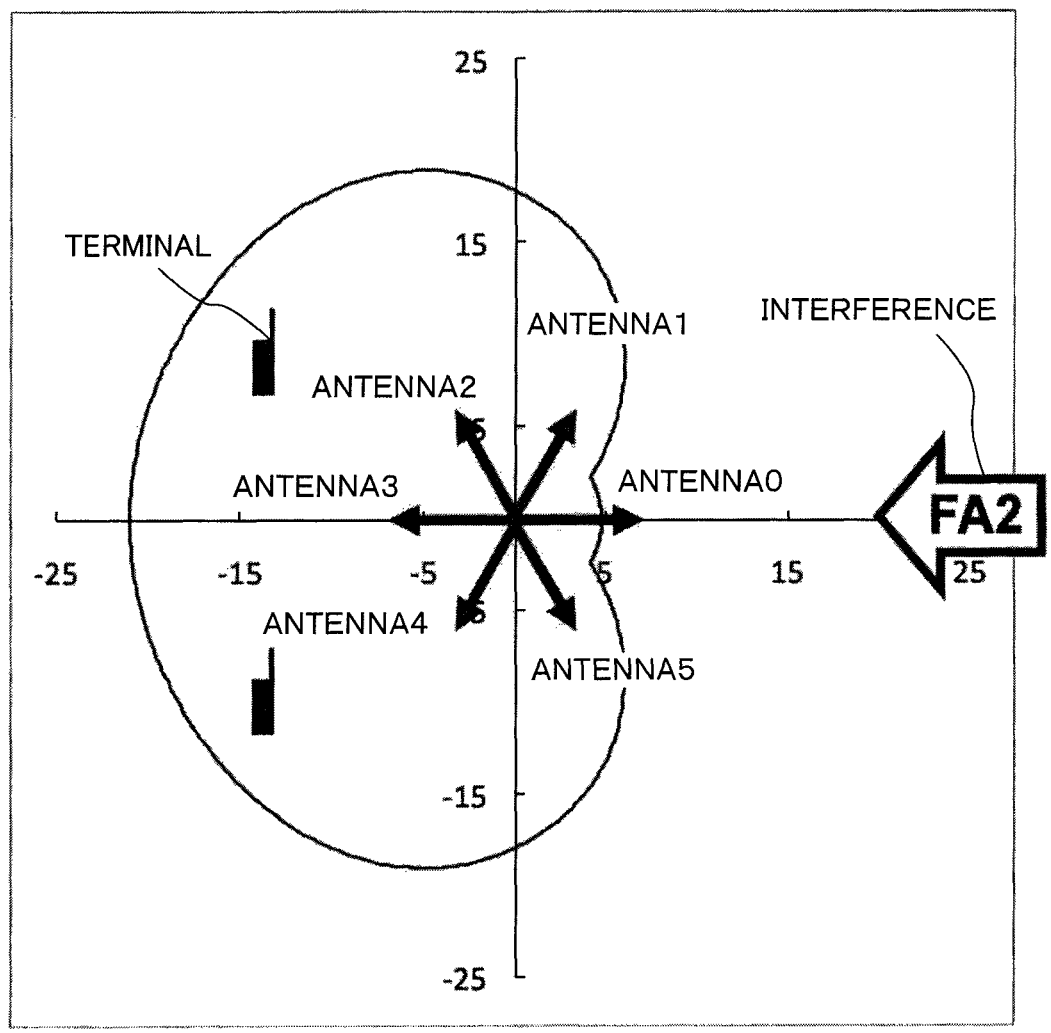
FIG. 25 is a schematic diagram showing the antenna pattern for the interference of "FA2", in the first embodiment.
Figure 26:
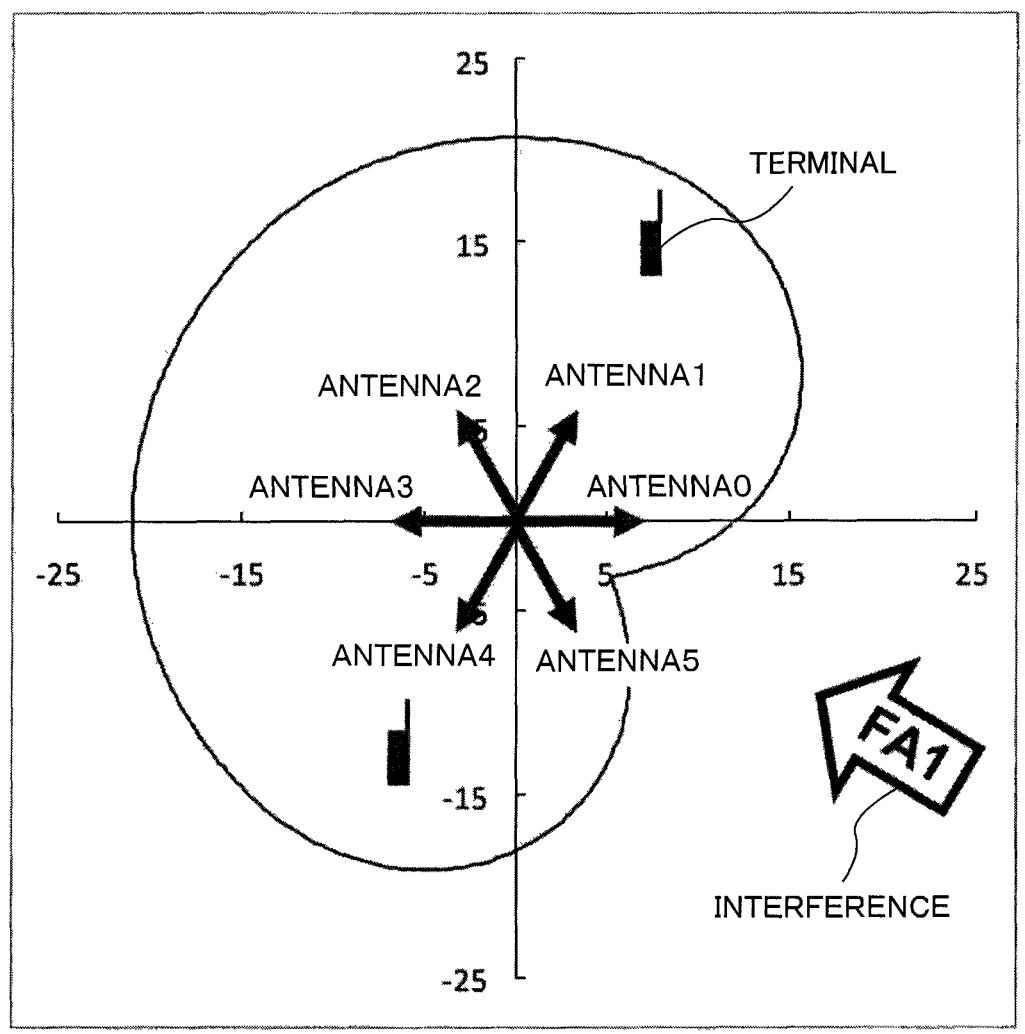
FIG. 26 is a schematic diagram showing the antenna pattern for the interference of "FA1", in the first embodiment.

FIG. 23 shows the interference situation of the base station having the antenna and beam pattern shown in FIG. 6. In FIG. 23, it is assumed that the interference of the frequency bands arrives from the base stations in surrounding three directions. It can be seen that there are the large interference "FA0" from the upper left base station, the large interference "FA2" from the right base station, and the large interference "FA1" from the lower right base station. It is assumed that the interference from other directions is very low, because of the small load. In this case, mutual interference occurs if the transmission is made with the antenna having the beam in a direction with the large interference, thus lowering the throughput. This lowers the transmission power of the antenna in this corresponding direction. For the sake of simplicity, descriptions will now be made to the antenna for lowering the transmission power is set to have transmission power of 0. Numerical numbers "0", "1", . . . , "6" are given to the antennas in a counterclockwise direction, from the antenna facing the right direction. In this case, no signal is transmitted from the antennas "1", "2", and "3" near the interference direction, for "FA0". Similarly, no signal is transmitted from the antennas "0", "1", and "5" for "FA2", and further no signal is transmitted from the antennas "0" and "5" for "FA1". FIG. 24 shows the beam pattern of "FA0", FIG. 25 shows the beam pattern of "FA", and FIG. 26 shows the beam pattern of "FA1". As shown in FIG. 25, two terminals exist in the direction of antennas 2, 3, and 4. When communication requirements are highly made from the terminals, at least two antennas can be seen from each terminal, thus enabling signal multiplexing. As shown in FIG. 26, two terminals connected to "FA1" exist in the directions of the antennas 1 and 4. When communication requirements are not highly made and requirements can satisfactorily be made with a very small number of antenna(s), inter-cell interference can be minimized without transmission with any antenna facing the direction without the corresponding terminals. Therefore, no signal is transmitted from the antennas 2 and 3.

Figure 27:
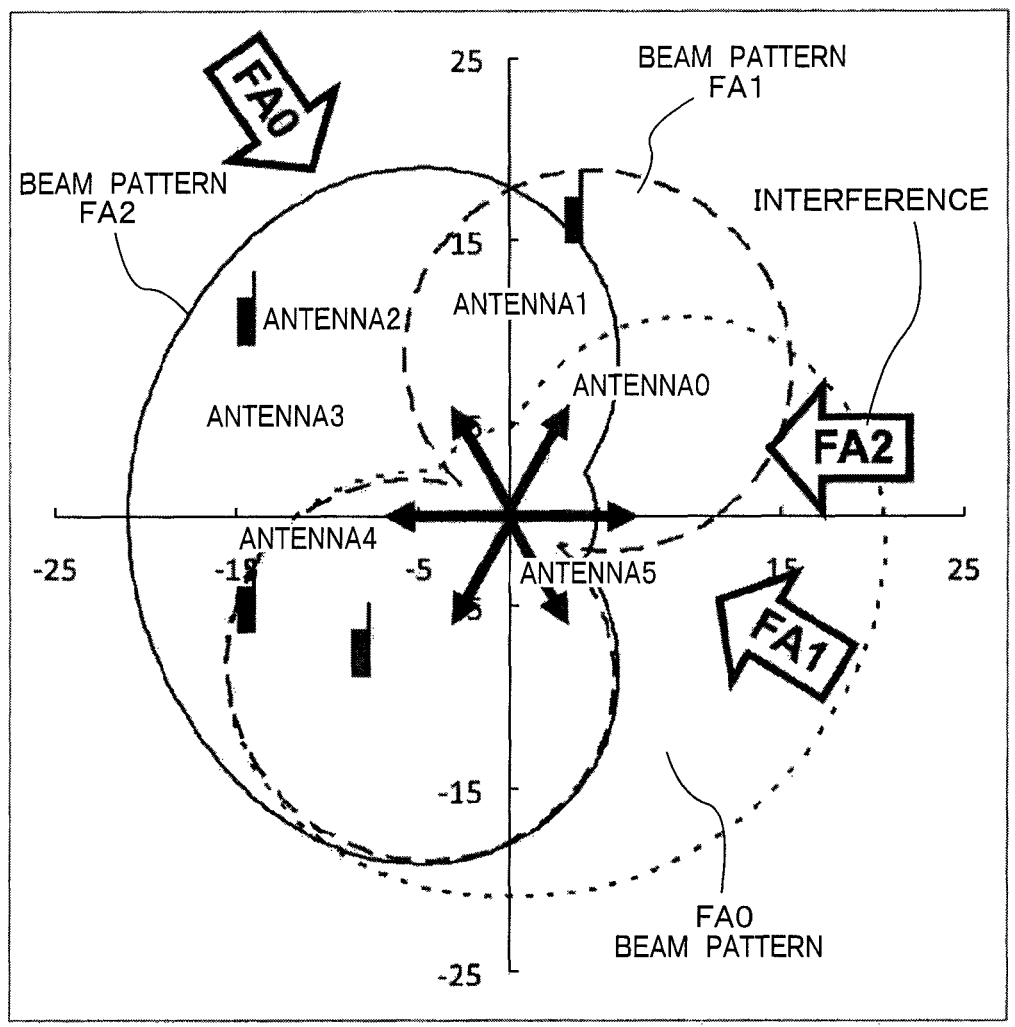
FIG. 27 is a schematic diagram showing a controlled result of the antenna patterns, in the first embodiment.

Accordingly, by adjusting the transmission power of the antennas, the beam pattern of FIG. 27 can be attained. With application of the configuration of this embodiment, the inter-cell interference can be minimized by dynamically changing the cell-form in plural frequencies based on the interference situation from the neighbor cell(s), while an antenna(s) can be selected to satisfy the communication requirement from the terminal. Further, the above-described control is performed in the plural frequency bands, thus enabling each terminal to adaptively select a high quality frequency band.

Second Embodiment

Figure 29:
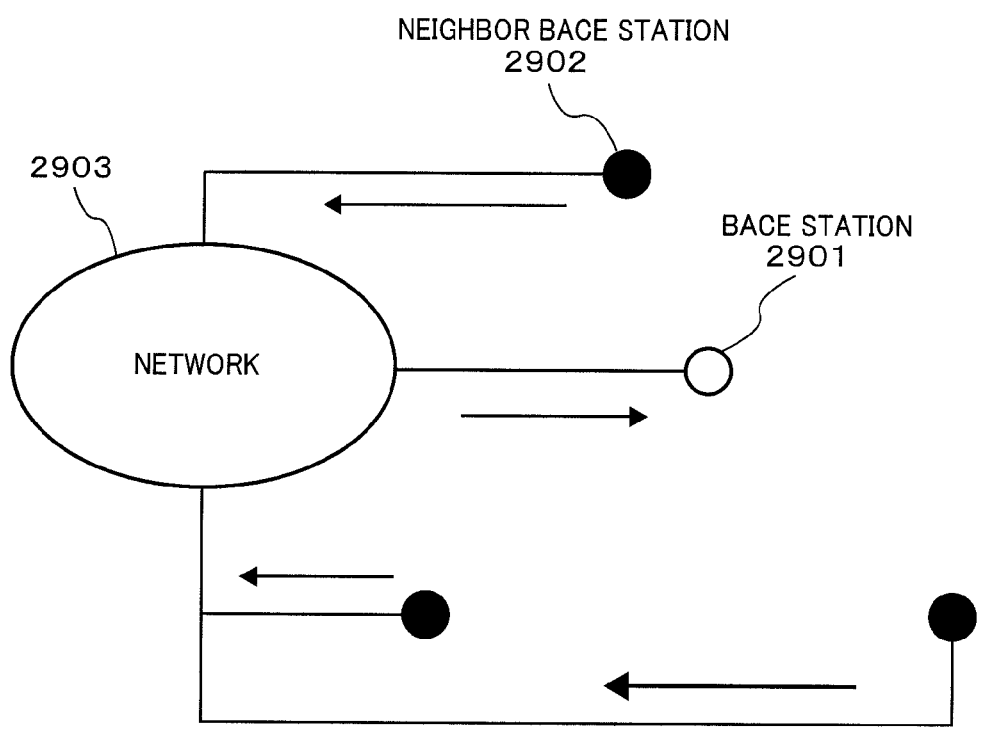
FIG. 29 is a diagram showing a scheme of a network configuration for reporting interference information, according to the second embodiment.

A second embodiment of the present invention will now be described with reference to the drawings. As shown in FIG. 29, in the second embodiment, in order for a base station 2901 to acquire interference information from a neighbor base station 2902, the neighbor base station 2902 reports information regarding the interference through a network 2903 to the base station 2901.

Figure 28:
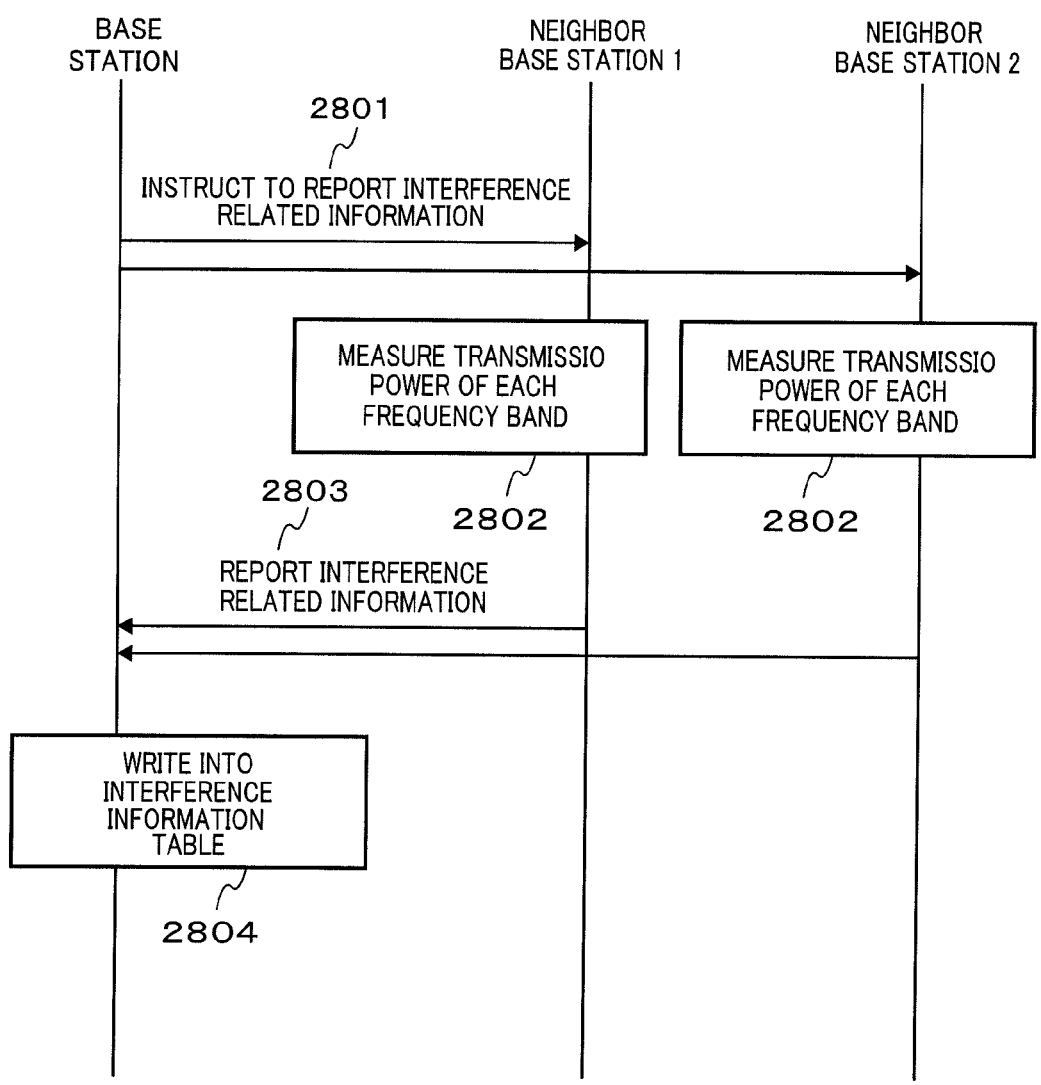
FIG. 28 is a diagram showing a sequence of reporting interference information, according to a second embodiment of the present invention.

FIG. 28 shows a sequence of the reporting by the neighbor base station.

In step 2801, a base station instructs a neighbor base station to report interference-related information through a network. Because the base station needs to acquire the interference information from each antenna direction, it needs to acquire the load of the antenna facing the direction of the corresponding base station, in each frequency band of the neighbor base station. Thus, the interference-related information that the corresponding base station instructs the neighbor base station to report includes location information of the neighbor base station(s) and information representing combinations between directions of antennas and transmission powers of frequency bands.

In step 2802, the neighbor base station having received the reporting instruction measures the transmission power of each antenna.

In step 2803, the neighbor base station transmits the interference-related information to the base station through a network.

In step 2804, the base station writes the reported interference-related information in the interference information table.

The flowchart of this process is not limited to this, and may be made in any other form, as long as it controls the neighbor base station to report information regarding the interference of each frequency band, in relation to each antenna direction of the base station. For example, each base station may regularly report its neighbor base station(s) of information regarding the interference. For reduction of information, the information regarding the interference may be limited to information for an antenna facing a direction of a base station that requires the corresponding information.

Figure 30:
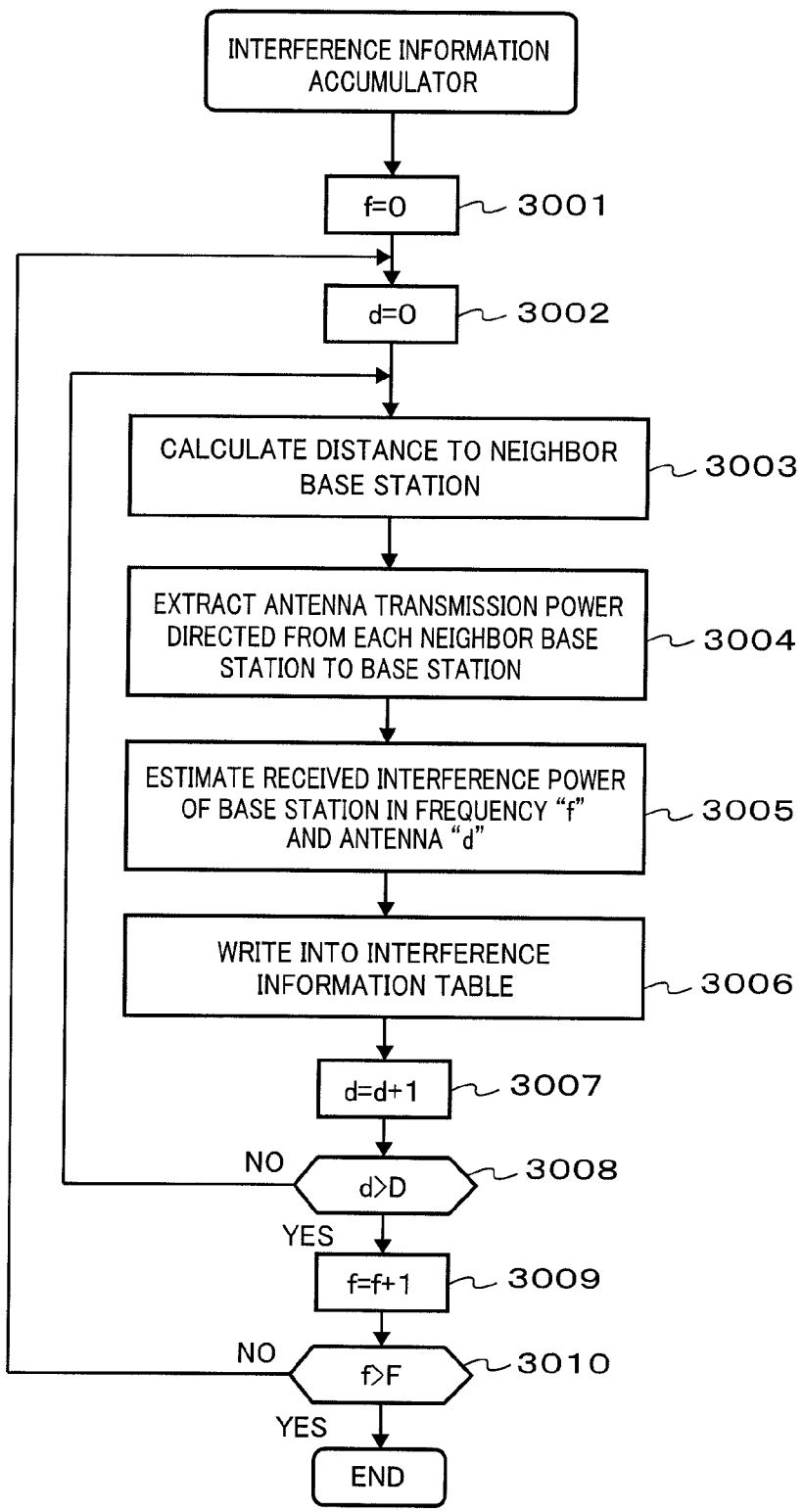
FIG. 30 is a diagram showing a flowchart of an interference information accumulator, according to the second embodiment.

Other configurations are same as those of the first embodiment. The flowchart of the interference information accumulator 1001 is shown in FIG. 30.

In step 3001, the frequency band "f" to be accumulated is initialized.

In step 3002, the antenna direction "d" to be accumulated is initialized.

In step 3003, the distance to a neighbor base station is measured based on location information of the interference related information.

In step 3004, the unit 1001 extracts the transmission power from the antennas facing the corresponding base station and belonging to each of plural neighbor base stations. At this time, the unit 1001 selects the transmission power of an antenna "g" at the smallest angle to the antenna "d", from the antenna direction information and location information of each neighbor base station. Of antennas of the neighbor base stations, the unit 1001 selects an antenna facing the direction nearest to the corresponding base station, and extracts the transmission power.

In step 3005, the unit 1001 estimates the received power corresponding to the frequency band "f" and the antenna direction "d" from the neighbor base station. The received power "U" of the corresponding base station is estimated by Equation 5, based on location information regarding the transmission power and the corresponding base station of the antenna nearest to the direction of the base station, as extracted in step 3004.

Equation 5

$$U = P\cos(\alpha - \theta) - L \quad \text{Equation 5}$$

"P" is the transmission power of the neighbor base station which has been extracted in step 3004, "α" is an angle between the corresponding base station and the neighbor base station, and "θ" is the antenna direction of the neighbor base station which has been extracted in step 3004. "L" is a path loss, and is a function of the distance between the base stations. A method for obtaining the path loss is arbitrarily determined, as long as path loss increases as the distance therebetween increases. Further, the received power "U" obtained in relation to each neighbor base station is obtained by adding the received powers based on the beam pattern of the antenna "d" of the corresponding base station.

In step 3006, the received power estimated in step 3005 is written in the columns of the antenna direction "d" and the frequency band "f" of the interference information table 1003.

In step 3007, the antenna direction "d" to be searched is incremented.

In step 3008, if the entire antenna directions are not completely searched, the flow returns to step 3003. If the entire antenna directions are completely searched, the flow proceeds to step 3009.

In step 3009, the frequency band "f" to be searched is incremented.

In step 3010, if the entire frequency bands are not completely searched, the flow returns to step 3002. If the entire frequency bands are completely searched, the process ends.

The flowchart of FIG. 30 is not limited to this, and may be made in another form as long as the received power is obtained from the transmission power in each frequency band in association with the antenna near to the direction facing the base station, of antennas of the neighbor base station, so as to estimate the interference power.

In the second embodiment, the interference information is acquired through a network, thereby enabling to reduce a reporting operation of the terminals.

Third Embodiment

Figure 31:
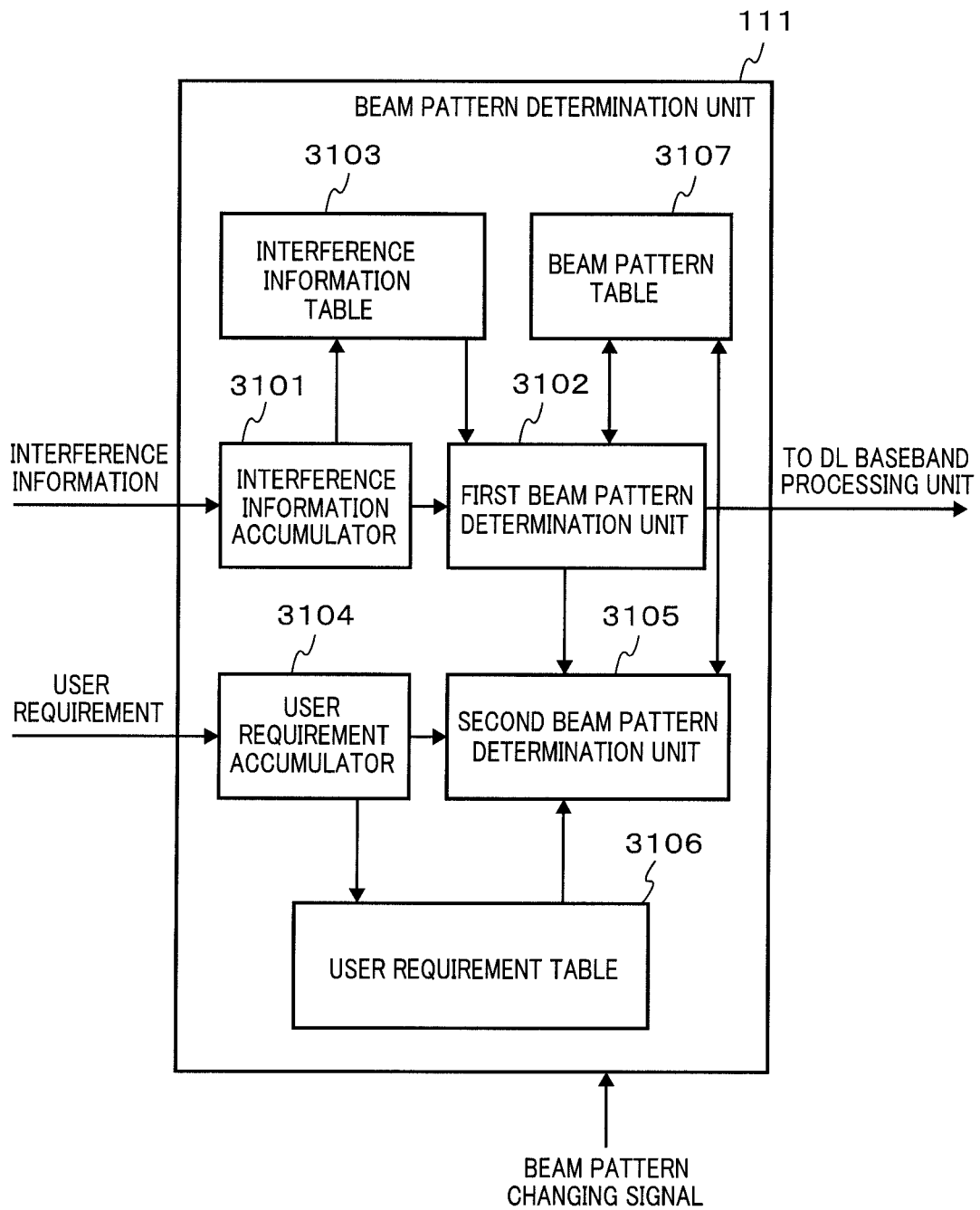
FIG. 31 is a block diagram showing a beam pattern determination unit 111, according to a third embodiment.

The third embodiment of the present invention will now be described with reference to the drawing. As shown in FIG. 31, in the third embodiment, the beam pattern determination unit 111 of FIG. 11 in the first embodiment has a configuration in which a second beam pattern determination unit 3105 performs processing first, and then a second beam pattern determination unit 3102 performs processing next. Other configurations are same as those of the first embodiment.

In the third embodiment, the transmission power of the antenna is changed in accordance with the terminal requirement information beforehand. As result, the user requirements are given priority over other controls.

Based on various embodiments, it is possible to minimize the inter-cell interference by changing the transmission power of the antenna(s), in accordance with the arrival direction of the interference on the plural antennas and in the plural frequency bands. The transmission power of the antenna is further changed in response to a user requirement, thereby selecting the antenna in accordance with the user requirement and improving the throughput.

Based on various embodiments, it is possible to provide a wireless communication unit and a wireless communication system that minimize the inter-cell interference, achieve high throughput if interference from the neighbor cell(s) is very low, and select the beam pattern suitable for the terminal communication requirements.

The invention claimed is:

1. A wireless base station comprising:
   at least one antenna or an antenna group which communicates with terminals in a plurality of frequency bands;

a communication control unit that assigns an individual wireless resource in a frame, to a terminal located in the wireless base station's cell area, and that controls transmitting and receiving of data to and from the terminal using the wireless resource; and a beam pattern determination unit including a first beam pattern determination unit that determines transmission power of the antenna or antenna group, where determined transmission power is based on a signal reported by the terminal, with the signal including information of interference power that the terminal experiences, and is further based on a direction in which the signal arrives at the wireless base station, and a second beam pattern determination unit that estimates a number of antennas of the wireless base station necessary for communication with the terminal based on communication requirement information of the terminal, and that further determines the transmission power of the antenna or antenna group of the wireless base station in accordance with both the estimated said number of antennas of the wireless base station and received power of the transmission signal reported by the terminal.

2. The wireless base station according to claim 1, wherein:
the base station sends instruction to each terminal of a plurality of terminals, to measure the interference experienced by the terminal, in one or more frequency band, and estimates an arrival direction at the wireless base station, of a signal providing a report of the interference in the plurality of frequency bands, based on the received power of the signal received by the antenna or antenna group which receives the report corresponding to the instruction.

3. The wireless base station according to claim 1, wherein:
the wireless base station:
controls a neighbor base station to report: transmission power of an antenna or antenna group of the neighbor base station, in each of the plurality of frequency bands, location information of the neighbor base station, and direction information of the antenna or antenna group of the neighbor base station, and
estimates interference power at the neighbor base station, and an arrival direction of the interference at the neighbor base station, based on the transmission power of the antenna or antenna group of the neighbor base station and the location information of the neighbor base station.

4. The wireless base station according to claim 1, wherein:
the first beam pattern determination unit decreases the transmission power of the wireless base station's said antenna or antenna group having an interference power reported by the terminal, which is greater than a first threshold value, and increases the transmission power of the wireless base station's said antenna or antenna group having an interference power reported by the terminal, which is lower than a second threshold value.

5. The wireless base station according to claim 1, wherein:
the second beam pattern determination unit increases the transmission power of the wireless base station's said antenna or antenna group having a received power above an upper threshold, and decreases the transmission power of the wireless base station's said antenna or antenna group having a received power below a lower threshold.

6. The wireless base station according to claim 1, wherein the wireless base station communicates with the terminal in a plurality of frequency bands, and
the beam pattern determination unit adjusts the transmission power of each antenna in the plurality of frequency bands.

7. A wireless communication system comprising:
a wireless base station including:
at least one antenna or an antenna group which communicates with terminals in a plurality of frequency bands;
a communication control unit that assigns an individual wireless resource in a frame, to a terminal located in the wireless base station's cell area, and that controls transmitting and receiving of data to and from the terminal using the wireless resource; and
a beam pattern determination unit including a first beam pattern determination unit that determines transmission power of the antenna or antenna group, where determined transmission power is based on a signal reported by the terminal, with the signal including information of interference power that the terminal experiences, and is further based on a direction in which the signal arrives at the wireless base station, and a second beam pattern determination unit that estimates a number of antennas of the wireless base station necessary for communication with the terminal based on communication requirement information of the terminal, and that further determines the transmission power of the antenna or antenna group of the wireless base station in accordance with both the estimated said number of antennas and received power of the transmission signal reported by the terminal.

* * * * *